United States Patent
Huang et al.

(10) Patent No.: US 11,997,151 B2
(45) Date of Patent: May 28, 2024

(54) MULTIMEDIA DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventors: Wei Huang, Shenzhen (CN); Weijie Qi, Shenzhen (CN); Yunbo Han, Shenzhen (CN); Hualiang Yan, Shenzhen (CN); Yunfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/960,130

(22) Filed: Oct. 5, 2022

(65) Prior Publication Data
US 2023/0093174 A1   Mar. 23, 2023

Related U.S. Application Data

(63) Continuation of application No. PCT/CN2021/109239, filed on Jul. 29, 2021.

(51) Int. Cl.
*G06F 15/16* (2006.01)
*H04L 65/61* (2022.01)
(Continued)

(52) U.S. Cl.
CPC .............. *H04L 65/61* (2022.05); *H04L 65/75* (2022.05); *H04L 65/80* (2013.01)

(58) Field of Classification Search
CPC .......... H04L 65/61; H04L 65/75; H04L 65/80
See application file for complete search history.

(56) References Cited

U.S. PATENT DOCUMENTS 10,735,815 B1 * 8/2020 Zhan ................. H04N 21/2385
11,006,161 B1 * 5/2021 Ducloux .......... H04N 21/23439
(Continued)

FOREIGN PATENT DOCUMENTS

CN          106454437 A       2/2017
CN          109982118 A       7/2019
(Continued)

OTHER PUBLICATIONS

Katsenou, et al.; Content-gnostic Bitrate Ladder Prediction for Adaptive Video Streaming; IEEE; Picture Coding Symposium Nov. 12-15, 2019 (Year: 2019).*
(Continued)

*Primary Examiner* — Oleg Survillo
(74) *Attorney, Agent, or Firm* — ANOVALAW GROUP PLLC

(57) ABSTRACT

A multimedia data processing method includes: acquiring a first predicted bit rate predicted by a bit rate prediction neural network based on first network data; performing classification and regression learning on the first network data and the first predicted bit rate to obtain a first bit rate prediction model; acquiring second network data and a second predicted bit rate predicted by the first bit rate prediction model, and the second network data being collected during playback of multimedia data using the second predicted bit rate; and performing classification and regression learning on the first bit rate prediction model based on a difference between the first network data and the second network data and a difference between the first predicted bit rate and the second predicted bit rate, to obtain a second bit rate prediction model configured to perform bit rate prediction in a terminal that plays the multimedia data.

20 Claims, 11 Drawing Sheets

(51) Int. Cl.
*H04L 65/75* (2022.01)
*H04L 65/80* (2022.01)

(56) References Cited

U.S. PATENT DOCUMENTS

| | | | | |
|---|---|---|---|---|
| 11,361,404 | B2* | 6/2022 | Kim | H04N 19/164 |
| 2020/0007409 | A1* | 1/2020 | Kim | G06F 16/258 |
| 2020/0012272 | A1* | 1/2020 | Miyake | G06F 30/20 |
| 2020/0099733 | A1* | 3/2020 | Chu | H04N 21/8456 |
| 2021/0360233 | A1* | 11/2021 | Ishtiaq | H04L 65/764 |
| 2022/0232222 | A1* | 7/2022 | Wu | H04N 19/136 |
| 2023/0046509 | A1* | 2/2023 | Liang | G10L 25/69 |
| 2023/0093174 | A1* | 3/2023 | Huang | H04L 65/75 |
| | | | | 709/231 |
| 2023/0104270 | A1* | 4/2023 | Wang | H04N 21/23418 |
| | | | | 375/240.03 |

FOREIGN PATENT DOCUMENTS

| | | |
|---|---|---|
| CN | 110324621 A | 10/2019 |
| CN | 110418177 A | 11/2019 |
| CN | 110996125 A | 4/2020 |
| CN | 111083535 A | 4/2020 |
| CN | 111107440 A | 5/2020 |
| EP | 3661225 A1 | 6/2020 |

OTHER PUBLICATIONS

The World Intellectual Property Organization (WIPO) International Search Report for PCT/CN2021/109239 dated Sep. 13, 2021 7 Pages (including translation).

* cited by examiner

MULTIMEDIA DATA PROCESSING METHOD AND APPARATUS, DEVICE, AND READABLE STORAGE MEDIUM

CROSS-REFERENCES TO RELATED APPLICATIONS

This application is a continuation application of PCT Patent Application No. PCT/CN2021/109239, entitled "MULTIMEDIA DATA PROCESSING METHOD AND APPARATUS, DEVICE AND READABLE STORAGE MEDIUM" and filed on Jul. 29, 2021, which claims priority to Chinese Patent Application No. 202010788005.0, entitled "MULTIMEDIA DATA PROCESSING METHOD AND APPARATUS, DEVICE, AND READABLE STORAGE MEDIUM", filed on Aug. 7, 2020, the entire contents of both of which are incorporated herein by reference.

FIELD OF THE TECHNOLOGY

The present disclosure relates to the field of computer technologies, and in particular, to a multimedia data processing method and apparatus, a device, and a readable storage medium.

BACKGROUND OF THE DISCLOSURE

With the development of broadcasting technologies and network video applications, video has become an important part of people's daily life, and people use a video for entertainment or learning. However, when a network status is unstable, a problem of video picture freezing may occur.

At present, a bit rate for transmission is mainly adjusted according to current network conditions, so as to alleviate the problem of video picture freezing. However, this method is to reduce the bit rate to alleviate the problem of video freezing, which has certain lag, resulting in poor smoothness during playback of multimedia data.

SUMMARY

Embodiments of the present disclosure provide a multimedia data processing method and apparatus, a device, and a readable storage medium.

An aspect of the embodiments of the present disclosure provides a multimedia data processing method, including: acquiring first network data and a first predicted bit rate corresponding to multimedia data, the first predicted bit rate being predicted by a bit rate prediction neural network based on the first network data; performing classification and regression learning on the first network data and the first predicted bit rate to obtain a first bit rate prediction model; acquiring second network data and a second predicted bit rate, the second predicted bit rate being predicted by the first bit rate prediction model, and the second network data being network data collected during playback of the multimedia data using the second predicted bit rate; and performing classification and regression learning on the first bit rate prediction model based on a difference between the first network data and the second network data and a difference between the first predicted bit rate and the second predicted bit rate, to obtain a second bit rate prediction model. The second bit rate prediction model is configured to perform bit rate prediction in a terminal that plays the multimedia data.

An aspect of the embodiments of the present disclosure provides a multimedia data processing method, performed by a terminal, the terminal including a second bit rate prediction model, and the method including: collecting network data; inputting the network data into the second bit rate prediction model to obtain a predicted target bit rate; and requesting, based on the predicted target bit rate, a content server to play multimedia data; the second bit rate prediction model being a model generated by using the multimedia data processing method provided in the aspect of the embodiments of the present disclosure.

An aspect of the embodiments of the present disclosure provides a multimedia data processing apparatus, including: a first acquisition module, configured to acquire first network data and a first predicted bit rate corresponding to multimedia data, the first predicted bit rate being predicted by a bit rate prediction neural network based on the first network data; a first model generation module, configured to perform classification and regression learning on the first network data and the first predicted bit rate, to obtain a first bit rate prediction model; a second acquisition module, configured to acquire second network data and a second predicted bit rate corresponding to the multimedia data, the second predicted bit rate being predicted by the first bit rate prediction model, and the second network data being network data collected during playback of the multimedia data using the second predicted bit rate; and a second model generation module, configured to perform classification and regression learning on the first bit rate prediction model based on a difference between the first network data and the second network data and a difference between the first predicted bit rate and the second predicted bit rate, to obtain a second bit rate prediction model, the second bit rate prediction model being configured to perform bit rate prediction in a terminal that plays the multimedia data.

An aspect of the embodiments of the present disclosure provides a computer device, including a processor and a memory, the memory storing a computer program, the computer program, when executed by the processor, causing the processor to perform the method in the embodiments of the present disclosure.

An aspect of the embodiments of the present disclosure provides a non-transitory computer-readable storage medium, the computer-readable storage medium storing a computer program, the computer program including a program instruction, the program instruction, when executed by a processor, causing the processor to perform the method in the embodiments of the present disclosure.

In the embodiments of the present disclosure, the classification and regression learning is performed on the first bit rate prediction model based on a difference between data outputted by a relatively accurate bit rate prediction neural network and data outputted by the first bit rate prediction model (also referred to as an initial bit rate prediction model) having low running overhead, causing a result outputted by the first bit rate prediction model to be as approximate as possible to a structure outputted by the bit rate prediction neural network, so as to train the first bit rate prediction model as the second bit rate prediction model having high accuracy and low running overhead. In this way, the second bit rate prediction model having the low running overhead may be arranged in the terminal, thereby achieving the effect of accurately performing bit rate prediction in the terminal.

The second bit rate prediction model (also referred to as a lightweight bit rate prediction model) is constructed by performing the classification and regression learning on the first bit rate prediction model based on the difference between the first network data (also referred to as historical network data) and the second network data (also referred to as target network data) and the difference between the first predicted bit rate (also referred to as a historical predicted media bit rate) and the second predicted bit rate (also referred to as an initial predicted media bit rate). The first bit rate prediction model is a model obtained by performing the classification and regression learning on the first network data and the first predicted bit rate. Since the first network data and the first predicted bit rate are determined by the bit rate prediction neural network having higher bit rate prediction accuracy, the second bit rate prediction model constructed according to the first network data and the first predicted bit rate may also have higher bit rate prediction accuracy. In addition, compared with the neural network, the second bit rate prediction model constructed by the classification and regression learning has a characteristic of a lightweight structure. The second bit rate prediction model, when deployed in the terminal, may cause the running overhead of the terminal to be lower.

In addition, for network data within any period of time, the second bit rate prediction model may accurately predict the bit rate matching the network data. The terminal may play a target video block in a next period of time based on the predicted bit rate, thereby achieving adaptive bitrate network data. It is to be understood that this method of training the bit rate prediction neural network and performing lightweight conversion of the bit rate prediction neural network to obtain the second bit rate prediction model may cause the second bit rate model to be deployed on the terminal (such as a user terminal). Since the second bit rate prediction model is obtained based on the bit rate prediction neural network, the second bit rate prediction model also has higher bit rate prediction accuracy. In this way, the media bit rate may be adjusted in time when the network changes to make a response to a network change in real time, thereby reducing multimedia data (for example, video data) freezing, improving the fluency of playing the multimedia data, and reducing a waste of a network bandwidth. In addition, since the second bit rate prediction model has the characteristic of the lightweight structure and can be deployed in the terminal, compared with the solution of deploying the bit rate prediction neural network in the terminal, the solution of the present disclosure can reduce the running overhead of the terminal.

BRIEF DESCRIPTION OF THE DRAWINGS

To describe the technical solutions in the embodiments of the present disclosure more clearly, the following briefly describes the drawings required for describing the embodiments. Evidently, the drawings in the following description show merely a part of embodiments of the present disclosure, and a person of ordinary skill in the art may derive other drawings from the outlined drawings without making any creative effort.

DESCRIPTION OF EMBODIMENTS

Figure 1:
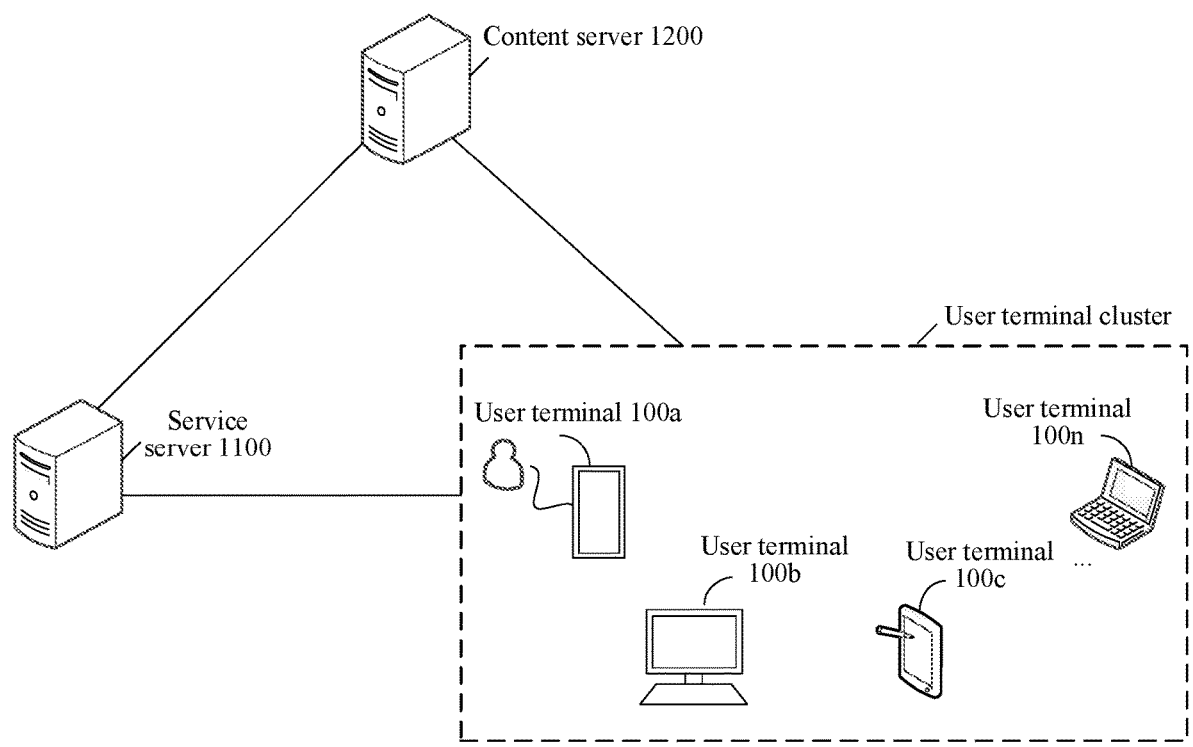
FIG. 1 is a diagram of a network architecture according to an embodiment of the present disclosure.

Hereinafter, the technical solutions of the embodiments of the present disclosure will be described clearly and completely in combination with the accompanying drawings in the embodiments of the present disclosure. It is obvious that the described embodiments are merely a part but not all of the embodiments of the present disclosure. All other embodiments obtained by a person of ordinary skill in the art based on the embodiments of the present disclosure without creative efforts fall within the protection scope of the present disclosure.

Artificial Intelligence (AI) is a theory, a method, a technology, and an application system that uses a digital computer or a machine controlled by the digital computer to simulate, extend, and expand human intelligence, perceive the environment, acquire knowledge, and use knowledge to obtain the best result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like.

With the research and progress of artificial intelligence (AI) technologies, the AI technology has been researched and applied in many fields, such as a common smart home, a smart wearable device, a virtual assistant, a smart speaker, smart marketing, unmanned driving, automatic driving, an unmanned aerial vehicle, a robot, smart medical care, smart customer service, and the like. It is believed that with the development of technologies, the AI technology is to be applied in more fields and plays increasingly important value.

The solution provided in the embodiments of the present disclosure relates to technologies such as machine learning (ML) of the AI.

The ML is a multi-disciplinary interdiscipline, involving a plurality of disciplines such as probability theory, statistics, approximation theory, convex analysis, algorithm complexity theory, and the like. The machine learning specializes in studying how a computer simulates or implements a human learning behavior to obtain new knowledge or skills, and reorganize an existing knowledge structure, so as to keep improving performance of the computer. The ML is the core of the AI and a fundamental way to make computers intelligent, which is applied in all fields of the AI. The machine learning and deep learning generally include technologies such as an artificial neural network, a belief network, reinforcement learning, transfer learning, inductive learning, and learning from demonstrations.

FIG. 1 is a diagram of a network architecture according to an embodiment of the present disclosure. As shown in FIG. 1, the network architecture may include a service server 1100, a content server 1200, and a user terminal cluster. The user terminal cluster may include one or more user terminals, and a quantity of the user terminals is not limited herein. As shown in FIG. 1, the plurality of user terminals may include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may respectively perform network connection with the service server 1100, so that each user terminal may perform data interaction with the service server 1100 through the network connection. The user terminal 100a, the user terminal 100b, the user terminal 100c, . . . , and the user terminal 100n may respectively perform network connection with the content server 1200, so that each user terminal may perform data interaction with the content server 1200 through the network connection. The service server 1100 may be connected to the content server 1200 through a network, so that data interaction can be performed between the service server 1100 and the content server 1200.

It may be understood that each user terminal shown in FIG. 1 may be installed with a target application. The target application, when running in each user terminal, may perform data interaction with the service server 1100 or the content server 1200 shown in FIG. 1, so that the service server 1100 or the content server 1200 may receive service data from each user terminal. The target application may include an application having a function of displaying data information such as characters, an image, an audio, a video, and the like. For example, the application may include a multimedia application (for example, a video application) or an entertainment application (for example, a game application). The video application and the entertainment application both may have multimedia data (for example, video and music) loading and playback functions.

It may be understood that a second bit rate prediction model (also referred to as a lightweight bit rate prediction model) may be deployed in the user terminal. When a user plays a target video in the target application (for example, the video application) through the user terminal, the user terminal may collect network data within a period of time (such as, a period of time 1) (for example, information such as a data size of a video block, a download time of the video block, a duration of the video block, a buffer size and duration of the video block corresponding to the period of time 1), and may transmit the network data corresponding to the period of time 1 to the second bit rate prediction model. The network data within the period of time 1 may be analyzed through the second bit rate prediction model, and a predicted bit rate (also referred to as a predicted media bit rate) suitable for the video block content corresponding to a period of time 2 is predicted. Then the user terminal may generate a video block content request based on the predicted bit rate, and transmit the video block content request carrying the predicted bit rate to the content server. The content server may transcode the video block content corresponding to the period of time 2 based on the predicted bit rate, to obtain transcoded video block content. Subsequently, the content server may return the transcoded video block content to the user terminal, the user terminal may play the transcoded video block content, and the user may also view the transcoded video block content within the period of time 2.

In some embodiments, it may be understood that, in the embodiments of the present disclosure, one of the plurality of user terminals may be selected as a target user terminal. The user terminal may include smart terminals such as a smart phone, a tablet computer, a notebook computer, a desktop computer, a smart TV, a smart speaker, a desktop computer, and a smart watch that carry multimedia data processing functions (for example, a video data playback function and a music data playback function), which is not limited thereto. For example, in the embodiments of the present disclosure, the user terminal 100a shown in FIG. 1 may be used as the target user terminal, and the target user terminal may be integrated with the foregoing target application. In this case, the target user terminal may perform data interaction with the service server 1100 through the target application.

It may be understood that the second bit rate prediction model may be deployed in the service server 1100, and the service server 1100 may collect service data from the application of the user terminal. For example, the service data may be collected network data (for example, information such as the data size of the video block, the download time of the video block, the duration of the video block, and the buffer size and duration of the video block corresponding to the period of time 1) corresponding to one video block of the target video within one period of time (such as the period of time 1) when a target user plays multimedia data (for example, the target video). The predicted bit rate matching the network data may be determined through the second bit rate prediction model in the service server 1100. The service server 1100 may generate a video transcoding request, and transmit the video transcoding request carrying the predicted media bit rate to the content server 1200. The content server 1200 may transcode the video block corresponding to the period of time 2 based on the predicted media bit rate to obtain a transcoded video block, and return the transcoded video block to the service server 1100 (alternatively, video blocks having a plurality of bit rates may also be generated in advance in the content server 1200. The content server 1200 returns the video block corresponding to the period of time 2 with the same bit rate as the predicted bit rate to the service server 1100 after acquiring the predicted bit rate). The service server 1100 may transmit the transcoded video block to the user terminal used by the target user, and the target user watches data of the transcoded video block within the period of time 2. Since the predicted bit rate is determined based on prediction of the network data within the period of time 1, and the predicted bit rate can match the network data within the period of time 2, less risk of video freezing occurs when the target user watches the transcoded video block within the period of time 2.

For example, when the user uses the target application (such as the video application) in the user terminal, the service server 1100 detects and collects, through the target application in the user terminal, a video played by the user that is a video A. The service server 1100 may collect the network data of the user terminal within a period of time 0-10 s of playing the video A, and then the service server 1100 may determine one predicted bit rate through the second bit rate prediction model. The service server 1100 may generate the video transcoding request based on the predicted bit rate, and transmit the video transcoding request to the content server 1200. The content server 1200 may transcode the corresponding video block within 10-20 s based on the predicted bit rate, and return the transcoded video block to the service server 1100. The service server 1100 may return the transcoded video block to the user terminal, and then the user may view data of the transcoded video block through the user terminal within a period of time of 10-20 s.

Figure 2:
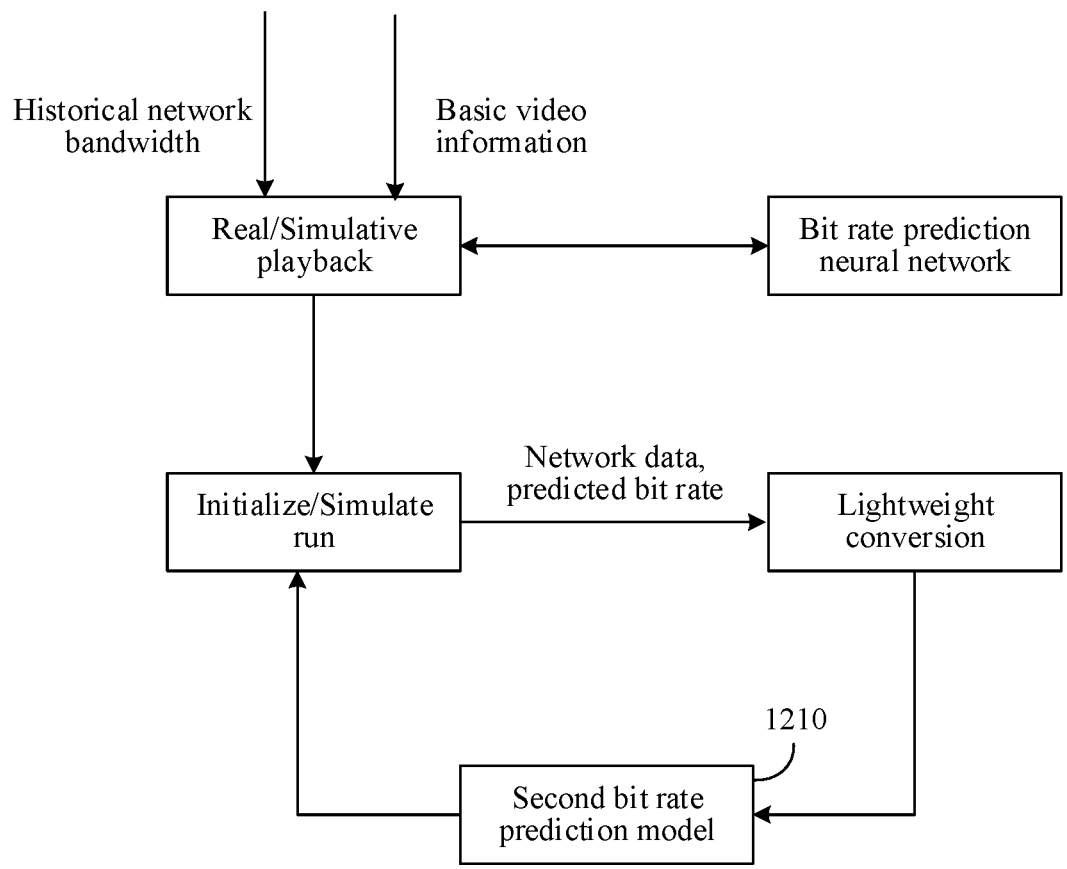
FIG. 2 is a schematic diagram of an architecture showing training of a second bit rate prediction model according to an embodiment of the present disclosure.

In order to improve prediction accuracy of the second bit rate prediction model for the bit rate, the second bit rate prediction model may be trained, so that the trained second bit rate prediction model can have higher bit rate prediction accuracy. For ease of understanding, refer to FIG. 2 together. FIG. 2 is a schematic diagram of an architecture showing training of a second bit rate prediction model according to an embodiment of the present disclosure.

As shown in FIG. 2, a simulation player may be arranged in the service server, and the second bit rate prediction model may be trained in the service server. When the simulation player simulates playback (or actual playback) of multimedia data, the bit rate prediction neural network may be trained by collecting a historical network bandwidth and basic video information. After the trained bit rate prediction neural network is obtained, the bit rate prediction neural network may be initialized in the simulation player (that is to say, playback of the multimedia data is simulated by the simulation player, and a test run is performed on the bit rate prediction neural network). During the test run of the bit rate prediction neural network, the bit rate prediction neural network may output a corresponding predicted bit rate by inputting network data into the bit rate prediction neural network, thereby forming an array including the network data and the predicted bit rate. Lightweight conversion may be performed on the bit rate prediction neural network based on the array including the network data and the predicted bit rate, to obtain the second bit rate prediction model. Similarly, a test run may be performed on the second bit rate prediction model, new network data is collected and inputted into the second bit rate prediction model, and the second bit rate prediction model may output the predicted bit rate, so that the array including the new network data and the new predicted bit rate can be obtained based on the second bit rate prediction model. According to the array including the new network data and the new predicted bit rate and the array including the network data and the predicted bit rate obtained by the bit rate prediction neural network, the second bit rate prediction model may be modified and trained to obtain a new second bit rate prediction model. Therefore, the second bit rate prediction model having higher bit rate prediction accuracy may be obtained through a plurality of times of modification and training.

For a specific process of training the second bit rate model, reference may be made to descriptions of step S101 to step S104 in the embodiment corresponding to FIG. 4 below.

It may be understood that the method provided in this embodiment of the present disclosure may be performed by a computer device, the computer device including but not limited to a user terminal or a service server. The service server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), a big data and artificial intelligence platform, and the like.

The user terminal and the service server may be directly or indirectly connected in a manner of wired or wireless communication, which is not limited herein in the present disclosure.

Figure 3:
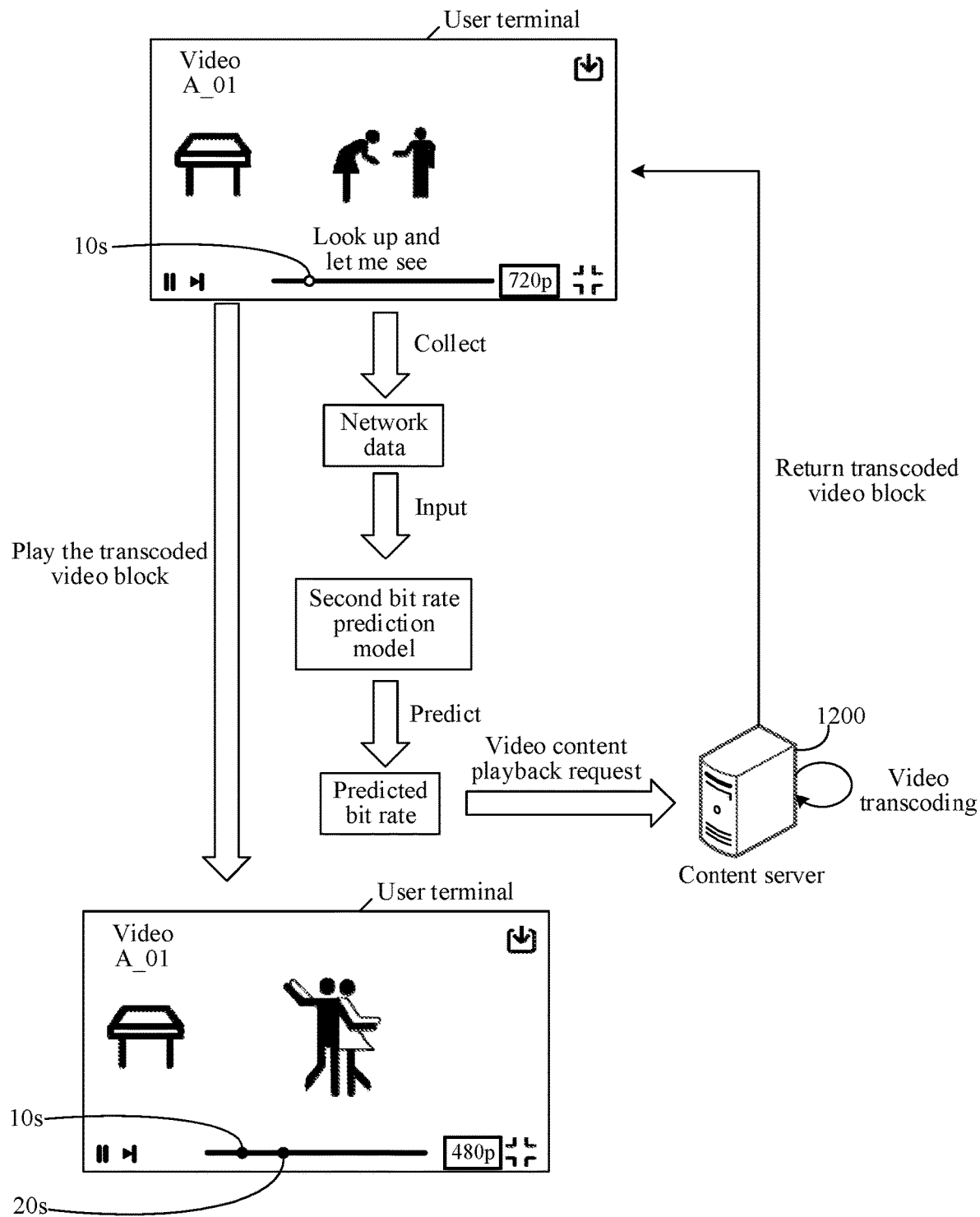
FIG. 3 is a schematic diagram of a scenario according to an embodiment of the present disclosure.

For ease of understanding, FIG. 3 is a schematic diagram of a scenario according to an embodiment of the present disclosure. The content server 1200 shown in FIG. 3 may be the content server in the embodiment corresponding to FIG. 1, and the user terminal shown in FIG. 3 may be any user terminal selected from a user terminal cluster in the embodiment corresponding to FIG. 1. For example, the user terminal may be the foregoing user terminal 100b. A network collection component and a second bit rate prediction model are deployed in the user terminal shown in FIG. 3.

As shown in FIG. 3, a target user (such as a user A) is playing a first episode of a video A through the user terminal. During playback of a period of time 0-10 s, the network collection component in the user terminal may collect the network data of the period of time 0-10 s (the network data may be configured to represent the network data of the video block corresponding to this period of time, such as a data size of the video block, a buffer size and duration of the video block, the bit rate value, and the like). Subsequently, the network collection component may transmit the collected network data within 0-10 s to the second bit rate prediction model in the user terminal. The network data (the data size of the video block, the buffer size and duration of the video block, the bit rate value, and the like) may be analyzed by the second bit rate prediction model to predict a predicted bit rate adapted to the video block corresponding to a next period of time (such as 10-20 s) of 0-10 s. Then, the user terminal may generate one video content playback request based on the predicted bit rate, and transmit the video content playback request to the content server 1200. The content server 1200 may acquire the video block content during 10-20 s in the first episode of the video A, and transcode the video block content during 10-20 s based on the predicted bit rate to obtain transcoded video block content. Subsequently, the service server may return the transcoded video block content during 10-20 s to the user terminal, and the user terminal may play the video block content transcoded based on the predicted bit rate during 10-20 s.

As shown in FIG. 3, since the network data collected within 0-10 s has poor quality (for example, a network speed within 0-10 s is relatively low and a buffer duration of the video block within 0-10 s is relatively short), the predicted bit rate obtained by the second bit rate prediction model based on the network data with poor quality is also low, and the video content corresponding to the 10-20 s is played at a lower bit rate (as shown in FIG. 3, the bit rate is reduced from 720 P to 480 P). In spite of the network data with poor quality, since the predicted bit rate predicted by the second bit rate prediction model is relatively low, a probability of the video freezing is relatively small when the target user views the video content corresponding to 10-20 s in a poor network data environment.

It is to be understood that, by analyzing the network data during 0-10 s collected by the network collection component, one predicted bit rate may be predicted to match the network data within 10-20 s. The predicted bit rate determined by the second bit rate prediction model based on the network data during 0-10 s may be desirably adapted to a network change situation during 10-20 s, so that the video freezing does not occur when the user views the video content during 10-20 s, thereby improving user experience quality.

Figure 4:
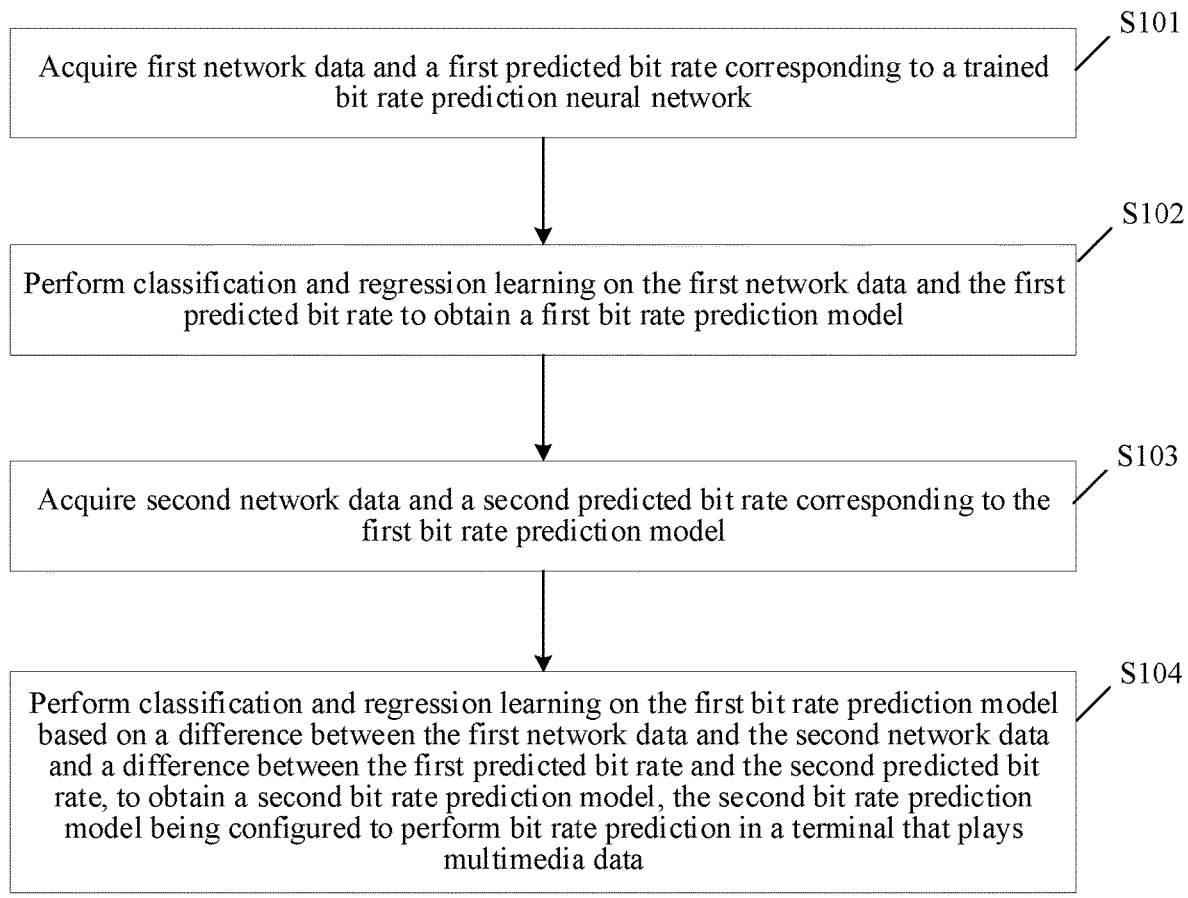
FIG. 4 is a schematic flowchart of a multimedia data processing method according to an embodiment of the present disclosure.

Further, FIG. 4 is a schematic flowchart of a multimedia data processing method according to an embodiment of the present disclosure. As shown in FIG. 4, the method may be performed by a user terminal (for example, the user terminal shown in FIG. 3), or may be performed by a service server (for example, the service server shown in FIG. 3), and may further be jointly performed by the user terminal and the service server. For ease of understanding, this embodiment is described by using the method performed by the service server as an example, to illustrate a specific process of training a second bit rate prediction model in the service server. The method may include at least the following steps S101-S104.

Step S101: Acquire first network data and a first predicted bit rate corresponding to a trained bit rate prediction neural network.

In the present disclosure, the bit rate prediction neural network may be a recurrent neural network (RNN), may further be a convolutional neural network (CNN), and may further be a residual network (ResNet), and the like, which is not described one by one by using an example herein.

In the present disclosure, the method based on reinforcement learning may be adopted to train the bit rate prediction neural network, so as to obtain the trained bit rate prediction neural network. For a specific implementation of training the bit rate prediction neural network, reference may be made to descriptions of steps S201-S203 in the following embodiment corresponding to FIG. 6.

Further, the trained bit rate prediction neural network may be deployed in the simulation player (the simulation player may be arranged in the service server, so that during a test run of the bit rate prediction neural network, the simulation player may simulate playback of multimedia data, and a media bit rate during simulative playback of the multimedia data is based on the bit rate determined by the bit rate prediction neural network). In a process of simulating the request to play the multimedia data by the simulation player, $i^{th}$ subnetwork data (also referred to as first historical network data, i being an integer greater than or equal to 0) may be acquired, and the $i^{th}$ subnetwork data may be inputted into the bit rate prediction neural network. Then, an $i^{th}$ predicted sub-bit rate (also referred to as a first historical predicted media bit rate) matching the $i^{th}$ subnetwork data may be outputted through the bit rate prediction neural network. A simulative playback request for playing multimedia data may be transmitted to the content server through the simulation player. It is to be understood that the simulative playback request carries the $i^{th}$ predicted sub-bit rate. Then the network data may be collected by receiving the multimedia data transmitted by the content server based on the $i^{th}$ predicted sub-bit rate, and the collected network data is used as $(i+1)^{th}$ subnetwork data. Then the $(i+1)^{th}$ subnetwork data may be inputted into the bit rate prediction neural network to obtain an $(i+1)^{th}$ predicted sub-bit rate.

One data set may be formed between the $i^{th}$ subnetwork data and the $i^{th}$ predicted sub-bit rate. Similarly, one data set may be formed between the $(i+1)^{th}$ subnetwork data and the $(i+1)^{th}$ predicted sub-bit rate. The two data sets may be combined to obtain a historical data set. That is to say, the historical data set includes the first network data (including at least two historical subnetwork data, the at least two historical subnetwork data may include the $i^{th}$ subnetwork data and the $(i+1)^{th}$ subnetwork data) and the first predicted bit rate (including at least two predicted sub-bit rates, the at least two predicted sub-bit rates include the $i^{th}$ predicted sub-bit rate and the $(i+1)^{th}$ predicted sub-bit rate). Certainly, the first network data may further include more pieces of subnetwork data, and the first predicted bit rate may also include more predicted sub-bit rates to form more data sets. For an acquisition process of more data sets, reference may be made to the data set formed by the $i^{th}$ subnetwork data, the $(i+1)^{th}$ subnetwork data, the $i^{th}$ predicted sub-bit rate, and the $(i+1)^{th}$ predicted sub-bit rate.

In addition, the first network data may also be inputted into the bit rate prediction neural network, the first predicted bit rate is outputted through the bit rate prediction neural network, and the historical data set is generated according to the data set formed by the first network data and the first predicted bit rate. That is to say, the historical data set may also include only one piece of first network data and one first predicted bit rate.

It is to be understood that the process of deploying the trained bit rate prediction neural network in the simulation player and simulating the request to play the multimedia data in the simulation player is a process of the test run of the bit rate prediction neural network. The first network data may be network status information (for example, the data size of the video block, the buffer duration of the video block, the download time of the video block, the bit rate value corresponding to the video block, and the like) collected during the test run of the bit rate prediction neural network and the simulative playback of the multimedia data (such as the video data). During the test run, the first subnetwork data 1 (that is, the network status information of the video block corresponding to the period of time 1, which may also be referred to as historical network data 1) during the period of time 1 (a duration of the video block) is inputted into the bit rate prediction neural network. The bit rate prediction neural network may determine a first predicted sub-bit rate 1 (also referred to as historical predicted media bit rate 1). Subsequently, simulative playback may be performed on the video block corresponding to a period of time 2 within a next period of time 2 (the duration of the video block) based on the first predicted sub-bit rate 1, so that the second subnetwork data 2 (also referred to as historical network data 2) affected by the first predicted sub-bit rate 1 within the next period of time 2 may be collected. In addition, one new predicted bit rate (the second predicted sub-bit rate 2, also referred to as a historical predicted media bit rate 2) is predicted according to the second subnetwork data 2. In this way, the historical data set including [(the first subnetwork data 1, the first predicted sub-bit rate 1), (the second subnetwork data 2, the second predicted sub-bit rate 2), . . . , and ($n^{th}$ subnetwork data n, $n^{th}$ predicted sub-bit rate n)] may be formed.

Step S102: Perform classification and regression learning on the first network data and the first predicted bit rate to obtain a first bit rate prediction model.

In the present disclosure, the first bit rate prediction model may be constructed by performing the classification and regression learning on the first network data and the first predicted bit rate obtained by the bit rate prediction neural network. The performing the classification and regression learning on the first network data and the first predicted bit rate may mean learning the obtained first network data and first predicted bit rate by using algorithm rules of a classification and regression tree (CART), to construct a classification and regression decision tree. The classification and regression decision tree is the first bit rate prediction model. For ease of understanding, the algorithm of the classification and regression tree is to be described below.

The CART is one of classification data mining algorithms. The CART adopts a binary recursive segmentation technique. The segmentation method is to divide a current sample set (such as a historical data set) into two sample subsets by using a Gini index function based on a minimum distance, so that each non-leaf node generated has two branches. Therefore, the decision tree generated by the CART algorithm is a binary tree with a concise structure. The algorithm rules of the CART may be selecting features and dividing points based on a Gini index, so as to classify the sample set and construct a binary decision tree.

It is to be understood that an algorithm flow for the CART may be: using the sample set (for example, the historical data set) as a root node, starting from the root node, and calculating a Gini coefficient of existing features for this sample set (for each existing feature A, for each possible value a, divide the sample set into two parts depending on whether the test of a sample point A=a is "yes" or "no", and calculate the Gini index when A=a). Then, in each possible feature A and each possible segmentation point a, a feature having a smallest Gini index and a segmentation point corresponding to the feature may be selected as an optimal feature and an optimal segmentation point. According to the optimal feature and the optimal segmentation point, two subnodes may be generated from a current node (such as, the root node), and the sample set is allocated to the two subnodes according to the features. Similarly, the foregoing method for generating subnodes from the root node may be recursively called for two subnodes. Each subnode may generate two corresponding subnodes, thereby generating the classification and regression decision tree (the binary decision tree).

For example, the sample set being Table 1 is used as an example to illustrate the method for selecting the optimal feature and the optimal segmentation point according to the Gini index. The sample set shown in Table 1 has a total of 12 samples. Each sample is a description of a feature of an animal. As shown in Table 1, input features have a total of 8 features: a body temperature, surface coverage, viviparity, egg production, ability to fly, aquatic, having legs, and hibernation. As shown in Table 1, category signs may be classified into three categories: mammals, reptiles, and fish.

TABLE 1

| Name | Body temperature | Surface coverage | Viviparity | Egg production | Ability to fly | Aquatic | Having legs | Hibernation | Category sign |
|---|---|---|---|---|---|---|---|---|---|
| Human | Constant temperature | Hair | Yes | No | No | No | Yes | No | Mammals |
| Python | Cold-blooded | Scale | No | Yes | No | No | No | Yes | Reptiles |
| Salmon | Cold-blooded | Scale | No | Yes | No | Yes | No | No | Fish |
| Whale | Constant temperature | Hair | Yes | No | No | Yes | No | No | Mammals |
| Frog | Cold-blooded | N/A | No | Yes | No | Sometimes | Yes | Yes | Amphibians |
| Varanus | Cold-blooded | Scale | No | Yes | No | No | Yes | No | Reptiles |
| Bat | Constant temperature | Hair | Yes | No | Yes | No | Yes | No | Mammals |
| Cat | Constant temperature | Skin | Yes | No | No | No | Yes | No | Mammals |
| Stego-stomatigrinum | Cold-blooded | Scale | Yes | No | No | Yes | No | No | Fish |
| Sea turtle | Cold-blooded | Scale | No | Yes | No | Sometimes | Yes | No | Reptiles |
| Hystricidae | Constant temperature | Chaeta | Yes | No | No | No | Yes | Yes | Mammals |
| Eel | Cold-blooded | Scale | No | Yes | No | Yes | No | No | Fish |

The Gini index represents a probability that a selected random sample is wrongly classified. A smaller Gini index leads to a smaller probability that the sample is wrongly classified and higher purity of the sample set. A theoretical value of the Gini index ranges from 0 to 1. The Gini index is 0 when all samples belong to a same class. When all classes are distributed with the same probability in the sample, the Gini index is equal to $(C-1)/C$. C is a quantity of classes, and in this case, a value of the Gini index is a maximum value.

For example, the sample set D shown in Table 1 is divided into two subsets D1 and D2 by the feature A=a (body temperature=constant temperature). $|D|=12$, $|D1|=5$ (5 body temperatures are constant), and $|D2|=7$ (7 body temperatures are cold-blood). All samples in the subset D1 belong to the same class (all mammals), and therefore the Gini index (D1)=0. The samples in D2 may be classified into 3 categories: 3 reptiles, 3 fish, and 1 mammal, and it may be determined that the Gini index $(D2)=1-[(3/7)^2+(3/7)^2+(1/7)^2]=30/49$. According to the Gini index (D1) and the Gini index (D2), the Gini index of the sample set D shown in Table 1 under a condition that the body temperature is constant may be obtained. Similarly, the Gini index of the sample set D under each feature may be obtained by calculating the Gini index for all of the features by using the foregoing formula, and finally the feature corresponding to the minimum value of the Gini index is used to divide the samples.

It may be understood that the network data in the present disclosure may correspond to the 8 features shown in Table 1, and the predicted bit rates (for example, 270, 480, 720, and 1080) in the present disclosure may correspond to the category sign shown in Table 1. According to the present disclosure, the algorithm rules of the CART may be used to construct a classification and regression decision tree based on the historical data set (including the first network data and the first predicted bit rate), and the classification and regression decision tree is used as a first bit rate prediction model.

It may be understood that the classification and regression decision tree is constructed not only by using the algorithm rule of division by using the Gini index in the classification and regression tree, but also by using other algorithm rules in the classification and regression tree, which is not limited in the present disclosure.

Step S103: Acquire second network data and a second predicted bit rate corresponding to the first bit rate prediction model. After the first bit rate prediction model is obtained by performing the classification and regression learning on the historical data set (including the first network data and the first predicted bit rate) (learning the historical data set through the classification and regression tree algorithm), the first bit rate prediction model may be deployed in a simulation player. In a process of simulating a request to play the multimedia data in the simulation player, $i^{th}$ media network data (which may also be referred to as initial network data) may be acquired, and the $i^{th}$ media network data is inputted into the first bit rate prediction model. An $i^{th}$ predicted media bit rate (which may also be referred to as an initial predicted media bit rate) matching the $i^{th}$ media network data may be outputted through the first bit rate prediction model. Then, the simulative playback request for playing the multimedia data may be transmitted to a content server through the simulation player. It is to be understood that the simulative playback request carries the $i^{th}$ predicted media bit rate. Subsequently, the network data may be collected by receiving the multimedia data (for example, which may be transcoded multimedia data) transmitted by the content server based on the predicted media bit rate, and the collected network data is configured as $(i+1)^{th}$ media network data. Then the $(i+1)^{th}$ media network data is inputted into the first bit rate prediction model to obtain $(i+1)^{th}$ predicted media bit rate. The second network data includes at least the $i^{th}$ media network data and the $(i+1)^{th}$ media network data, and the second predicted bit rate includes at least the $i^{th}$ predicted media bit rate and the $(i+1)^{th}$ predicted media bit rate. The "i" in the media network data and in the predicted media bit rate and the "i" in the $i^{th}$ subnetwork data and in the $i^{th}$ predicted sub-bit rate may be the same value or different values, which is not limited in this embodiment of the present disclosure.

It is to be understood that, the second network data is inputted into the first bit rate prediction model, and the first bit rate prediction model may also output a second predicted bit rate for the second network data.

It is to be understood that the first bit rate prediction model may be deployed in the simulation player, and the process of simulating the request to play the multimedia data in the simulation player is a process of a test run of the first bit rate prediction model. During the test run, first media network data 1 within a period of time 1' is inputted into the first bit rate prediction model, and the first bit rate prediction model may determine one first predicted media bit rate 1. Subsequently, simulative playback may be performed on the multimedia data in a next period of time 2' based on the first predicted media bit rate 1, so that second media network data 2 affected by the first predicted media bit rate 1 in the next period of time 2' may be collected. A new predicted bit rate (the second predicted media bit rate 2) may be predicted according to the second media network data 2. In this way, a data set including [(the first media network data 1, the first predicted media bit rate 1), (the second media network data 2, the second predicted media bit rate 2), . . . , and $n^{th}$ media network data n, an $n^{th}$ predicted media bit rate n)] may be formed. The second network data in the data set (including the first media network data 1, . . . , and the $n^{th}$ media network data n) may be configured as the second network data, n being greater than i.

Step S104: Perform classification and regression learning on the first bit rate prediction model based on a difference between the first network data and the second network data and a difference between the first predicted bit rate and the second predicted bit rate, to obtain a second bit rate prediction model, the second bit rate prediction model being configured to perform bit rate prediction in a terminal that plays multimedia data.

In the present disclosure, the collected first network data may be acquired during the test run of the bit rate prediction neural network, and the collected second network data may be acquired during the test run of the first bit rate prediction model. The first network data (for example, the first subnetwork data 1, the second subnetwork data 2, . . . , and the $n^{th}$ subnetwork data n) may be merged with the second network data (for example, the $i^{th}$ media network data 1, . . . , and the $n^{th}$ media network data n) to obtain merged network data. Then, the merged network data may be inputted into the first bit rate prediction model, and a merged predicted bit rate (which may also be referred to as a merged predicted media bit rate) matching the merged network data may be outputted through the first bit rate prediction model. One data set may be formed according to the merged network data and the merged predicted bit rate. The data set formed by the merged network data and the merged predicted media bit rate may be aggregated with the historical data set (including the first network data and the first predicted bit rate), so that the aggregated data set can be obtained.

A manner of merging the first network data with the second network data may be splicing, aggregation, or the like. The merging manner is not limited in the present disclosure, and is not described by using examples one by one herein.

Further, the classification and regression learning may be performed on the aggregated data set to obtain a first updated bit rate prediction model. The second bit rate prediction model is determined by acquiring a first model update iteration number corresponding to the first updated bit rate prediction model, and the first updated bit rate prediction model may be determined as the second bit rate prediction model in response to the first model update iteration number satisfying an iteration number threshold. A third predicted bit rate may be obtained, in response to the first model update iteration number not satisfying the iteration number threshold, by predicting the first updated bit rate prediction model. Fourth network data may be collected during playback of the multimedia data using the third predicted bit rate, the first network data and the first predicted bit rate corresponding to the bit rate prediction neural network are reacquired at a current moment, and then the classification and regression learning is performed on the first updated bit rate prediction model based on a difference between the reacquired first network data and the fourth network data and a difference between the reacquired first predicted bit rate and the third predicted bit rate, to obtain a second updated bit rate prediction model. Then a second model update iteration number corresponding to the second updated bit rate prediction model may be acquired. The second updated bit rate prediction model is determined as the second bit rate prediction model in response to the second model update iteration number satisfying the iteration number threshold. In response to the model update iteration number not satisfying the iteration number threshold, the second updated bit rate prediction model may be determined as the first updated bit rate prediction model, and the step of predicting the third predicted bit rate by the first updated bit rate prediction model is performed. In this way, a process of cyclic learning is formed, and learning can proceed, so that the model update iteration number satisfies the iteration number threshold.

It is to be understood that the first updated bit rate prediction model is obtained by performing the classification and regression learning on the aggregated data set. In this case, the classification and regression learning (which are respectively the classification and regression learning on the historical data set and the classification and regression learning on the aggregated data set) has been performed on the data set twice, and the model update iteration number of the first updated bit rate prediction model is 2. If the iteration number threshold is 10, the model update iteration number 2 does not satisfy the iteration number threshold 10, and the test run may be performed on the first updated bit rate prediction model, thereby obtaining the update data set (including updated network data and updated predicted bit rate) corresponding to the first updated bit rate prediction model. Similarly, a new aggregated data set may be generated according to the historical data set, the updated network data, and the first updated bit rate prediction model corresponding to the bit rate prediction neural network. A new bit rate prediction model may be obtained by performing the classification and regression learning on the new aggregated data set. In addition, the model update iteration number 3 still does not satisfy the iteration number threshold 10, a test run performed on the new bit rate prediction model may continue, and the new bit rate prediction model continues to be constructed until the model update iteration number reaches the iteration number threshold 10. In this way, the constructed bit rate prediction model may be configured as the second bit rate prediction model.

Figure 5:
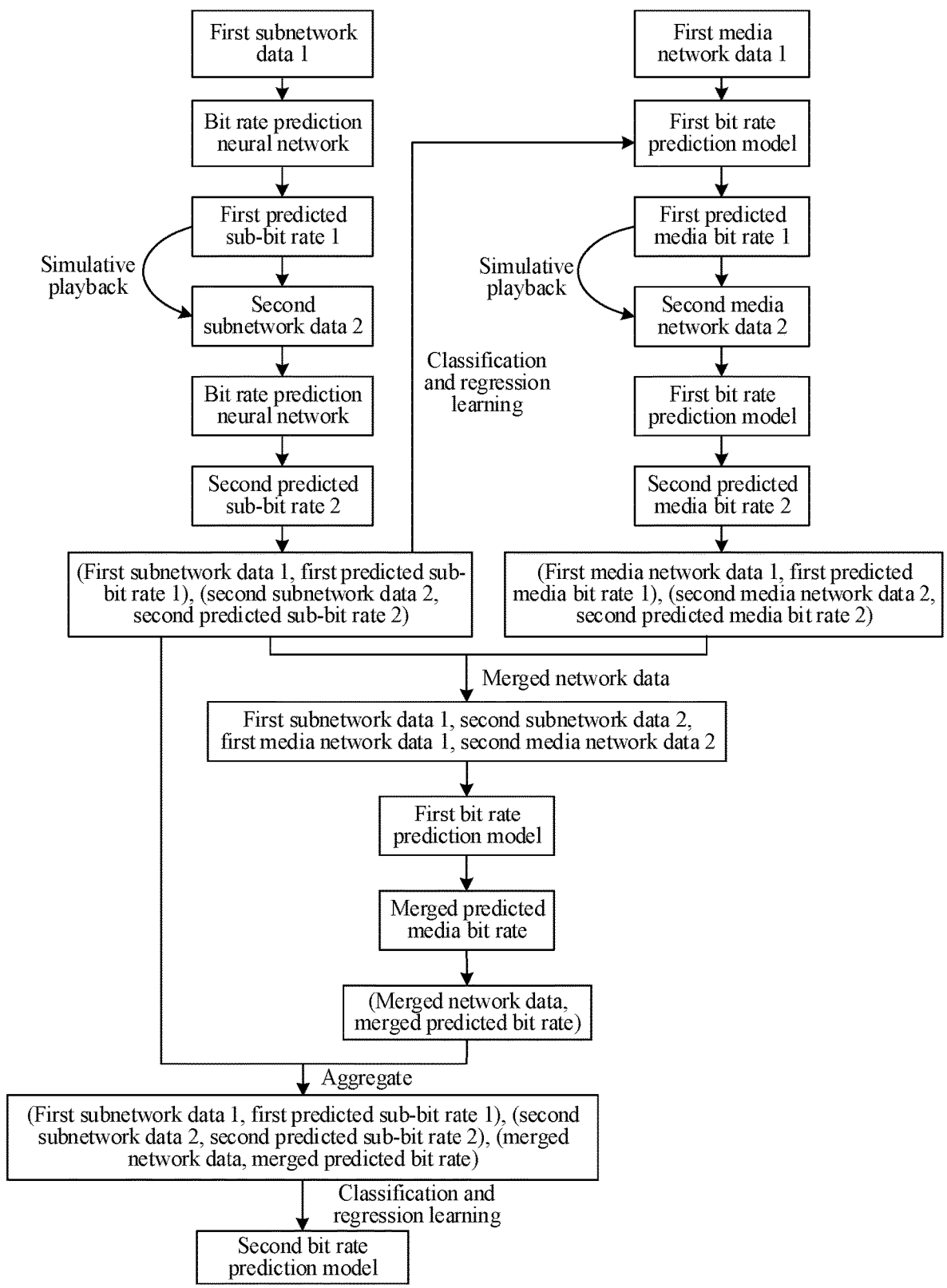
FIG. 5 is a schematic diagram showing generation of a second bit rate prediction model according to an embodiment of the present disclosure.

For ease of understanding, FIG. 5 is a schematic diagram showing generation of a second bit rate prediction model according to an embodiment of the present disclosure. The generation of the second bit rate prediction model shown in FIG. 5 is described by using the iteration number of 2 as an example.

As shown in FIG. 5, the test run may be performed on the trained bit rate prediction neural network, the collected first subnetwork data 1 (also referred to as the historical network data 1) within one period of time is inputted into the bit rate prediction neural network, and the first predicted sub-bit rate 1 (also referred to as the historical predicted media bit rate 1) may be outputted through the bit rate prediction neural network. Simulative playback may be performed on a video block in the next period of time based on the first predicted sub-bit rate 1, thereby collecting the second subnetwork data 2. The second subnetwork data 2 is inputted into the bit rate prediction neural network, and a second predicted sub-bit rate 2 may be outputted by the bit rate prediction neural network. Therefore, the historical data set including [(the first subnetwork data 1, the first predicted sub-bit rate 1), (the second subnetwork data 2, the second predicted sub-bit rate 2)] may be obtained.

Further, as shown in FIG. 5, the first bit rate prediction model (one iteration) may be constructed by performing the classification and regression learning on the historical data set, and the test run may be performed on the first bit rate prediction model. As shown in FIG. 5, the collected first media network data 1 within one period of time may be inputted into the first bit rate prediction model, and one first predicted media bit rate 1 may be outputted through the first bit rate prediction model. The simulative playback may be performed on the video block within the next period of time based on the first predicted media bit rate 1, thereby collecting the second media network data 2 within the next period of time. The second predicted media bit rate 2 can be obtained by inputting the second media network data 2 into the first bit rate prediction model. Therefore, the data set including [(the first media network data 1, the first predicted media bit rate 1), (the second media network data 2, the second predicted media bit rate 2)] may be obtained. The second network data includes at least the first media network data 1 and the second media network data, and the second predicted bit rate includes at least the first predicted media bit rate and the second predicted media bit rate. Certainly, the second network data may further include more pieces of media network data, and the second predicted bit rate may also include more predicted media bit rates, which are not limited in the embodiments of the present disclosure.

In order to cause a prediction effect of the bit rate prediction model to approximate that of the trained bit rate prediction neural network, the first network data and the second network data in the historical data set may be merged.

As shown in FIG. 5, after the first network data is merged with the second network data, the merged network data including [the first subnetwork data 1, the second subnetwork data 2, the first media network data 1, the second media network data 2] may be obtained. The merged network data is inputted into the first bit rate prediction model, and one merged predicted bit rate may be obtained, thereby forming a merged data set including [merged network data, merged predicted bit rate]. Then in order to cause the prediction effect of the bit rate prediction model to approximate that of the trained bit rate prediction neural network, the merged data set may be aggregated with the historical data set corresponding to the foregoing bit rate prediction neural network to generate an aggregated data set. One new bit rate prediction model (2 iterations) may be obtained by performing the classification and regression learning on the aggregated data set. In this case, the new bit rate prediction model is the bit rate prediction model generated by 2 iterations, and therefore the new bit rate prediction model can be configured as the second bit rate prediction model.

It is to be understood that the significance of merging the first network data with the second network data to obtain the merged network data and aggregating the historical data set and the merged data set (including the merged network data and a merged predicted bit rate) is to cause the second bit rate prediction model obtained through the classification and regression learning to be similar to the trained bit rate prediction neural network. Since the bit rate prediction neural network can have higher bit rate prediction accuracy after being trained based on reinforcement learning, the reinforcement learning is performed on the second bit rate prediction model by using the obtained first network data during the test run of the bit rate prediction neural network, so that the second bit rate prediction model also has higher bit rate prediction accuracy.

It may be understood that the significance of performing the classification and regression learning on a plurality of data sets (for example, historical data sets) is that, since the bit rate prediction neural network has a complex structure and a slow running speed, a file size of a user terminal is increased due to large consumption of computing resources by the predicted bit rate if the bit rate prediction neural network is deployed on the user terminal, thereby increasing running overhead. In order to reduce the running overhead, the CART (the second bit rate prediction model) may be constructed in a manner of the classification and regression learning. The second bit rate prediction model may be understood as a lightweight bit rate prediction neural network with a simple structure and a fast running speed. Since the decision tree is nonparametric and may express complex logic, the decision tree may also be very similar to the bit rate prediction neural network even if the bit rate prediction neural network has a highly nonlinear prediction boundary. Since the decision tree is very flexible, the decision tree can be narrowed down to a very fine granularity for search and prediction when required. The second bit rate prediction model may be deployed in a target terminal, and if the multimedia data is played in the target terminal, the second bit rate prediction model may be configured to perform media bit rate prediction.

At present, if the network is unstable or the user moves, an available video bandwidth fluctuates within a certain range. However, the network fluctuation may cause the bandwidth to decrease. In this case, if a video buffer runs out again, a problem of video picture freezing occurs during the video playback, which greatly damages user experience.

In the embodiments of the present disclosure, the classification and regression learning is performed on the first bit rate prediction model based on a difference between data outputted by a relatively accurate bit rate prediction neural network and data outputted by the first bit rate prediction model having low running overhead, causing a result outputted by the first bit rate prediction model to be as approximate as possible to a structure outputted by the bit rate prediction neural network, so as to train the first bit rate prediction model as the second bit rate prediction model having high accuracy and low running overhead. In this way, the second bit rate prediction model having the low running overhead may be arranged in the terminal, thereby achieving the effect of accurately performing bit rate prediction in the terminal.

The second bit rate prediction model used for performing the media bit rate prediction is constructed by performing the classification and regression learning on the aggregated data set, and the aggregated data set is aggregated according to the historical data set. Since the historical data set is determined by the bit rate prediction neural network with higher bit rate prediction accuracy, the second bit rate prediction model constructed according to the historical data set may also have higher bit rate prediction accuracy. In addition, compared with the neural network, the second bit rate prediction model constructed by the classification and regression learning has a characteristic of a lightweight structure. The second bit rate prediction model, when deployed in the target terminal, may cause the running overhead of the target terminal to be lower.

In addition, for network data within any period of time, the second bit rate prediction model may accurately predict the bit rate matching the network data. The terminal may play a target video block in a next period of time based on the predicted bit rate, thereby achieving adaptive bitrate network data. It is to be understood that this method of training the bit rate prediction neural network and performing lightweight conversion of the bit rate prediction neural network to obtain the second bit rate prediction model may cause the second bit rate model to be deployed on the terminal. Since the second bit rate prediction model is obtained based on the bit rate prediction neural network, the second bit rate prediction model also has higher bit rate prediction accuracy. In this way, the media bit rate may be adjusted in time when the network changes to make a response to a network change in real time, thereby reducing freeze of multimedia data (for example, video data), improving smoothness of playback of the multimedia data, and reducing a waste of a network bandwidth. In addition, since the second bit rate prediction model has the characteristic of the lightweight structure and can be deployed in the terminal, compared with the solution of deploying the bit rate prediction neural network in the terminal, the solution of the present disclosure can reduce the running overhead of the user terminal.

Figure 6:
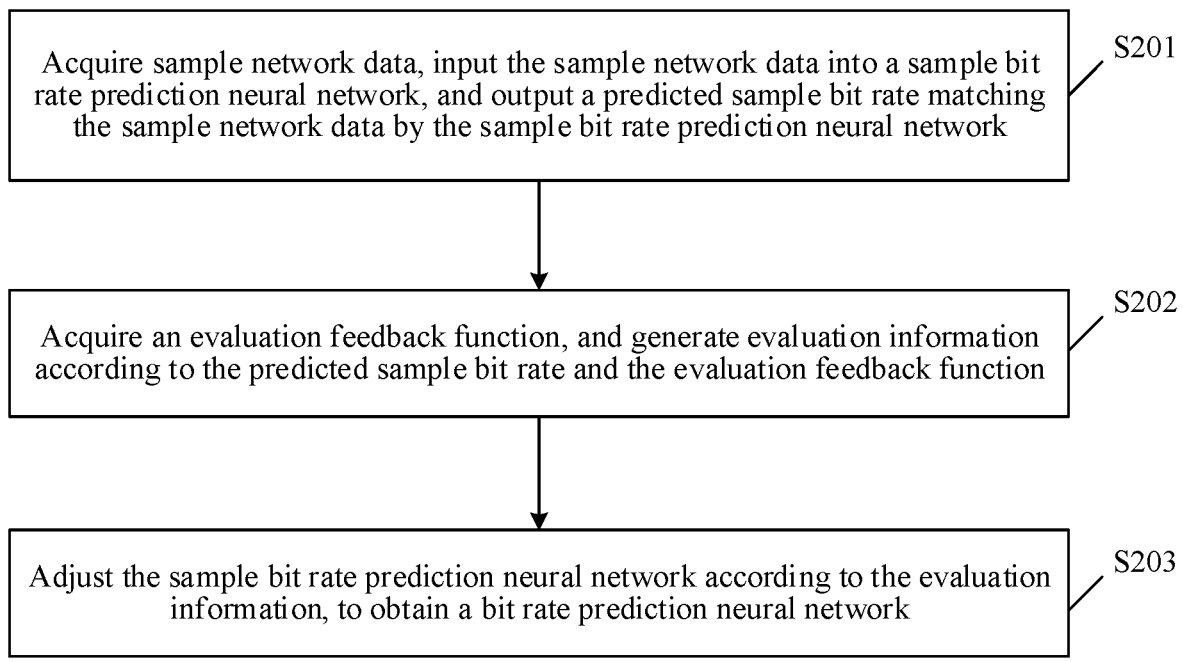
FIG. 6 is a schematic flowchart of training of a bit rate prediction neural network according to an embodiment of the present disclosure.

For ease of understanding, FIG. 6 is a schematic flowchart of a training bit rate prediction neural network according to an embodiment of the present disclosure. The method may be performed by a user terminal (for example, the user terminal shown in FIG. 3), or may be performed by a service server (for example, the service server shown in FIG. 3), and may be further jointly performed by the user terminal and the service server. As shown in FIG. 6, the process may include the following steps.

Step S201: Acquire sample network data, input the sample network data into a sample bit rate prediction neural network, and output a predicted sample bit rate matching the sample network data by the sample bit rate prediction neural network.

The predicted sample bit rate may also be referred to as a predicted sample media bit rate. In the present disclosure, the sample network data may be network data within one period of time acquired from a transmission network environment during training of the bit rate prediction neural network. The network data may include information such as a data size of a video block, a download time of the video block, a duration of the video block, a buffer size and duration, a re-buffer and load time, a quantity of remaining unplayed video blocks, a frame receiving time interval, a difference between an actual download time and a playback time, and a client playback frame rate. These pieces of information can jointly form one piece of sample network data.

It is to be understood that one video may be partitioned into a plurality of video blocks, and the sample network data herein may be information such as the data size, the download time, and the bit rate corresponding to the video block.

The acquired sample network data may be inputted into the sample bit rate prediction model. For example, the acquired network data within the period of time 1 (such as the video block) may be used as sample network data 1. The sample network data 1 is inputted into the sample bit rate prediction neural network, and one predicted sample bit rate 1 may be outputted through the sample bit rate prediction neural network. Then simulative playback may be performed on the video block corresponding to the next period of time by using the predicted sample bit rate 1, thereby collecting network data of the next period of time (such as sample network data 2). The sample network data 2 may be inputted into the sample bit rate prediction neural network, and the sample bit rate prediction neural network may output one predicted sample bit rate 2.

Step S202: Acquire an evaluation feedback function, and generate evaluation information according to the predicted sample bit rate and the evaluation feedback function.

In the present disclosure, freeze time information and bit rate fluctuation information corresponding to the predicted sample bit rate may be acquired. Evaluation feedback information for the predicted sample bit rate may be generated according to the freeze time information, the bit rate fluctuation information, the predicted sample bit rate, and the evaluation feedback function. It is to be understood that the evaluation feedback information may be used for reflecting a bit rate prediction effect of the bit rate prediction neural network on the sample network data. For example, the evaluation information may include an evaluation value (also referred to as an evaluation feedback value), and a larger evaluation value represents a better bit rate prediction effect of the bit rate prediction neural network.

A specific implementation for determining the evaluation value corresponding to the predicted sample bit rate may be shown in formula (1):

$$QoE = \Sigma_n q(R_n) - \mu \Sigma_n T_n - \gamma \Sigma_n |q(R_{n+1}) - q(R_n)| \quad \text{Formula (1)}$$

QoE (Quality of Experience) may be used for representing the evaluation value, n may be used for representing a serial number of period of times for collecting the sample network data, $R_n$ may be used for representing a bit rate value within an $n^{th}$ period of time, $q(R_n)$ may be used for representing a nonlinear operation performed on the bit rate value $R_n$ by using a preset nonlinear function q( ), $\Sigma_n q(R_n)$ may be used for representing summation of $q(R_n)$ obtained during n period of times, $T_n$ may be used for representing freeze time information within the $n^{th}$ period of time, $\Sigma_n T_n$ may be used for representing summation of the freeze time information during then period of times, $R_{n+1}$ may be used for representing a predicted sample bit rate obtained by corresponding sample network data within the $n^{th}$ period of time, $q(R_{n+1})$ may be used for representing a nonlinear operation performed on the predicted sample bit rate $R_{n+1}$ by using a preset nonlinear function qo, $|q(R_{n+1})-q(R_n)|$ may be used for representing bit rate fluctuation information within the $n^{th}$ period of time, $\Sigma_n |q(R_{n+1})-q(R_n)|$ may be used for representing a sum of the bit rate fluctuation information during the n period of times, and μ may be used for representing a weight of impact of the freeze time information on the evaluation value, and γ may be used for representing a weight of impact of the bit rate fluctuation information on the evaluation value. In addition, the evaluation feedback information may include different levels (such as, a high level, a medium level, and a low level). The different levels may be used for representing the bit rate prediction effect of the bit rate prediction neural network.

It is to be understood that the acquired network data within the period of time 1 (including the bit rate value $R_n$ within the period of time 1) may be configured as the sample network data 1. The sample network data 1 is inputted into the sample bit rate prediction neural network, and one predicted sample bit rate 1 (that is, ($R_{n+1}$)) may be outputted through the sample bit rate prediction neural network. The predicted sample bit rate 1 may be adapted to the network data of the next period of time (such as the period of time 2), and the bit rate fluctuation information corresponding to the period of time 1 may be determined according to the bit rate value ($R_n$) of the predicted sample bit rate 1 corresponding to the period of time 1. Then the freeze time information within the period of time 1 may be obtained through statistics, and the evaluation value for the predicted sample bit rate 1 may be determined through the freeze time information within the period of time 1, the predicted sample bit rate 1, the bit rate value acquired within the period of time 1, and the formula (1). A larger evaluation value indicates a higher degree of matching between the predicted sample bit rate 1 and the network data corresponding to the period of time 2 and a better bit rate prediction effect of the bit rate prediction neural network.

Step S203: Adjust the sample bit rate prediction neural network according to the evaluation information, to obtain the bit rate prediction neural network.

In the present disclosure, the sample bit rate prediction neural network may be adjusted through the evaluation information. When the evaluation feedback information includes the evaluation value, a specific method may include: acquiring an evaluation feedback threshold, and determining an evaluation difference between the evaluation value and the evaluation feedback threshold; determining that a degree of matching between the predicted sample bit rate and the sample network data does not satisfy a matching condition, adjusting a network parameter in the sample bit rate prediction neural network according to the evaluation difference, and determining the adjusted sample bit rate prediction neural network as a final bit rate prediction neural network, in response to the evaluation difference exceeding a difference range; and determining that the degree of matching between the predicted sample bit rate and the sample network data satisfies the matching condition, and determining the sample bit rate prediction neural network as the bit rate prediction neural network, in response to the evaluation difference falling within the difference range.

Figure 7:
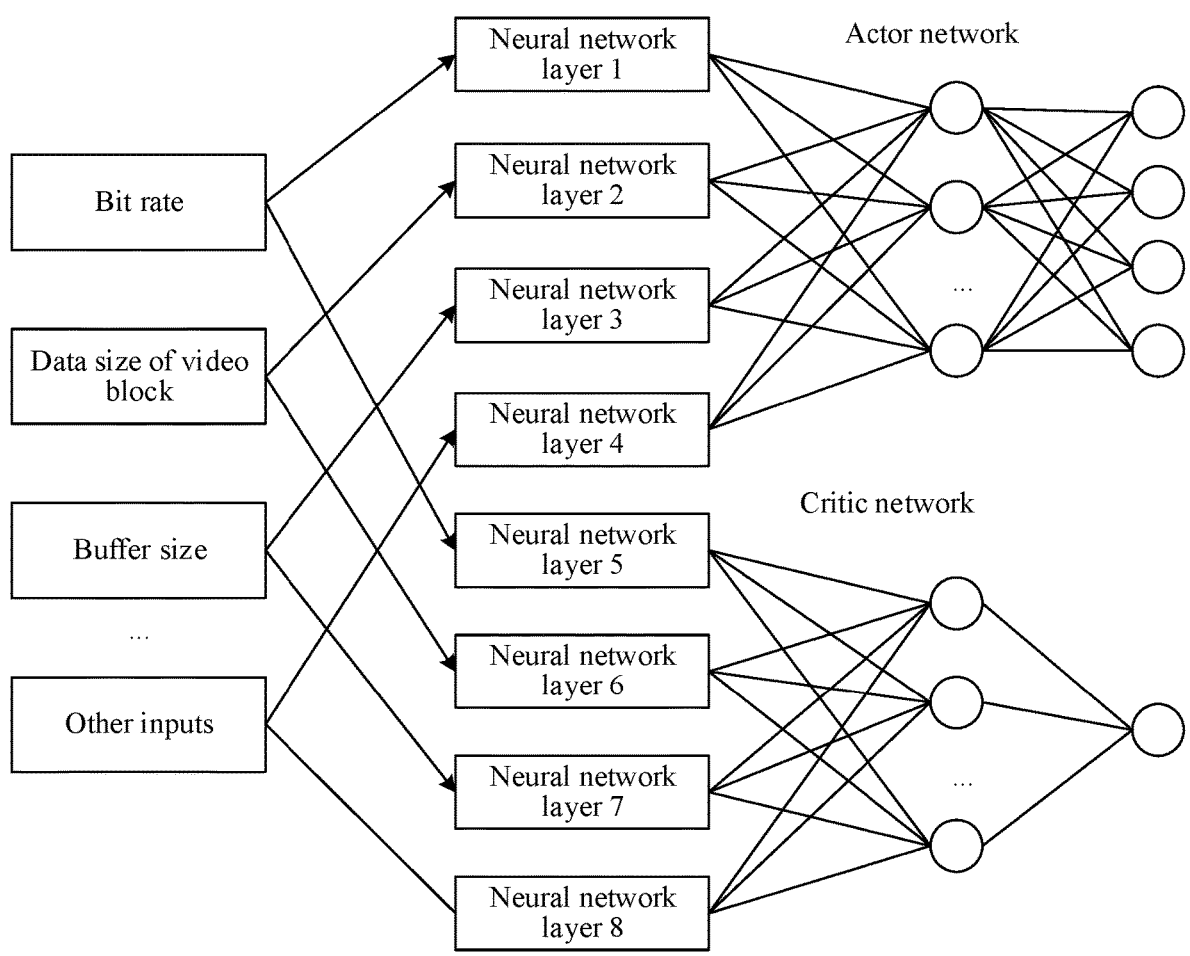
FIG. 7 is a schematic structural diagram showing training of a bit rate prediction neural network based on reinforcement learning according to an embodiment of the present disclosure.

For ease of understanding, FIG. 7 is a schematic structural diagram showing training of a bit rate prediction neural network based on reinforcement learning according to an embodiment of the present disclosure. As shown in FIG. 7, the bit rate prediction neural network may be a recurrent neural network (RNN) and a convolutional neural network (CNN). The bit rate prediction neural network may include an actor network and a critic network. The bit rate prediction neural network includes a plurality of neural network layers (for example, a neural network layer 1, . . . , and a neural network layer 8 shown in FIG. 7).

The actor network may be responsible for generating an action and interacting with the environment, and the critic network may be responsible for evaluating performance of the actor network and guiding actions of the actor network in a next stage.

The input of the bit rate prediction neural network is information such as the data size of the video block, the download time of the video block, the duration of the video block, the buffer size and duration, the re-buffer and load time, the quantity of remaining unplayed video blocks, a frame receiving time interval, a difference between an actual download time and a playback time, a client playback frame rate, and a bit rate value of a current period of time. The output of the bit rate prediction neural network is one predicted media bit rate value obtained based on the input information.

It may be understood that the critic network may evaluate each bit rate selection value (for example, 270 P, 480 P, 720

P, and 1080 P) according to the input information, so as to obtain the evaluation value corresponding to each bit rate selection value. An optimal evaluation value may be determined from these evaluation values, and the bit rate selection value corresponding to the optimal evaluation value may be configured as a final bit rate value to be outputted by the actor network. For example, if the bit rate selection value corresponding to the optimal evaluation value is 720 P, the actor network may output a predicted media bit rate of 720 P. In view of this, the bit rate prediction neural network may output one predicted media bit rate. Further, the evaluation value obtained from the predicted media bit rate may be calculated through the evaluation feedback function in the bit rate prediction neural network, the bit rate in the input information, and the predicted media bit rate. The evaluation value may be fed back to the critic network, and the critic network indicates adjustment of a network parameter in the bit rate prediction neural network through the evaluation value.

It may be understood that, the manner of training the prediction neural network includes but is not limited to a manner based on reinforcement learning, and may further be other manners with the effect of training optimization.

In this embodiment of the present disclosure, by collecting the network data of the video block a plurality of times and inputting the network data into the bit rate prediction neural network, the bit rate prediction neural network can output the corresponding bit rate prediction value. An evaluation value for the bit rate prediction value is obtained by using the evaluation feedback function. The evaluation value may be fed back to the critic network of the bit rate prediction neural network, and the network parameter in the bit rate prediction neural network may be adjusted through the critic network, so that the adjusted bit rate prediction neural network can output a more accurate bit rate prediction value, and an accuracy rate of predicting the bit rate by the bit rate prediction neural network can be improved.

Figure 8:
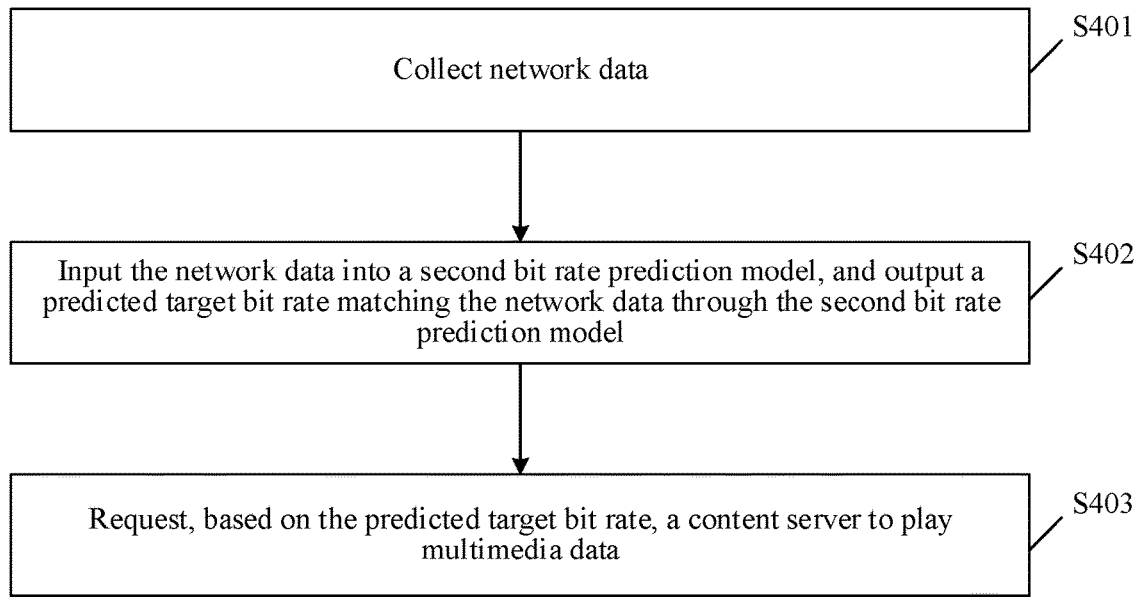
FIG. 8 is a schematic flowchart of a multimedia data processing method according to an embodiment of the present disclosure.

Further, for ease of understanding, FIG. 8 is a schematic flowchart of a multimedia data processing method according to an embodiment of the present disclosure. The method may be performed by a terminal, the terminal including a second bit rate prediction model and a network collection component. The second bit rate prediction model may be the second bit rate prediction model determined in the embodiment corresponding to FIG. 4. The terminal may be any user terminal in a user terminal cluster in the embodiment corresponding to FIG. 1. For example, the terminal is a user terminal 100*a*. As shown in FIG. 8, the process may include the following steps.

Step S401: Collect network data.

In this embodiment of the present disclosure, the user terminal may collect the network data within a target heartbeat cycle through the network collection component. In the present disclosure, a video may be partitioned into a video block, each video block corresponds to a period of time, and the target heartbeat cycle may be a period of time. The network data in each period of time may be collected (such as, the data size of the video block, the duration of the video block, the buffer size and duration, the quantity of remaining unplayed video blocks, the frame receiving time interval, the difference between the actual download time and the playback time, the bit rate value, and the like) through the network collection component in the target terminal.

Step S402: Input the network data into the second bit rate prediction model, and output a predicted target bit rate matching the network data through the second bit rate prediction model.

In the present disclosure, the second bit rate prediction model determined through steps S101-S103 in the embodiment corresponding to FIG. 4 may be deployed in the terminal, thereby achieving application of the second bit rate prediction model.

The network data collected by the network collection component may be inputted into the second bit rate prediction model deployed in the terminal, and the predicted target bit rate (which may also be referred to as a predicted target media bit rate) matching the network data may be outputted through the second bit rate prediction model.

Step S403: Request, based on the predicted target bit rate, a content server to play multimedia data.

In the present disclosure, a multimedia data content playback request may be generated according to the predicted target bit rate, and the multimedia data content playback request may be transmitted to the content server. Subsequently, target multimedia data returned by the content server may be received. The target multimedia data may be data obtained after transcoding the multimedia data based on the predicted target bit rate. Then the terminal may play the target multimedia data.

It may be understood that, for the significance of performing the classification and regression learning on the plurality of data sets (for example, a historical data set) herein, reference may be made to the discussion for FIG. 5, and details are not described herein again.

Figure 9:
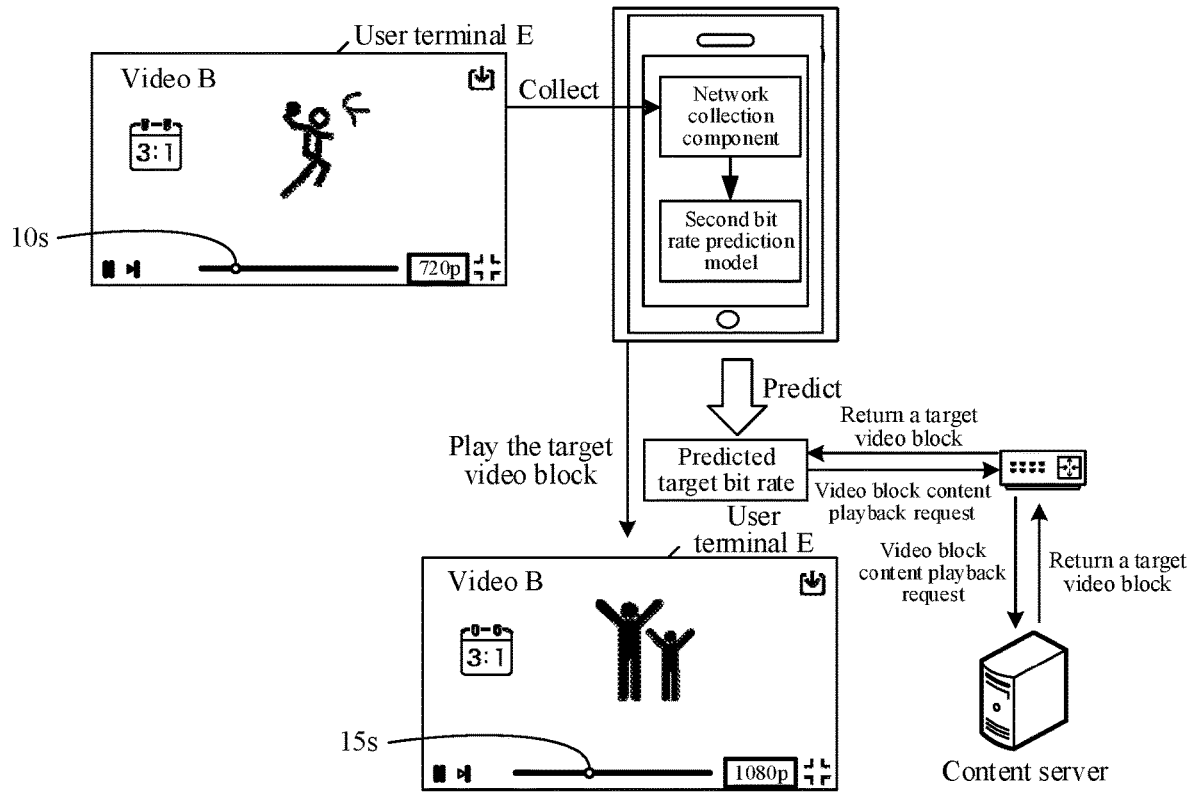
FIG. 9 is a schematic diagram of a scenario of model application according to an embodiment of the present disclosure.

For ease of understanding, FIG. 9 is a schematic diagram of a scenario of model application according to an embodiment of the present disclosure. The user terminal E may be any user terminal in the user terminal cluster in the embodiment corresponding to FIG. 1. For example, the user terminal E may be a user terminal 100*c*. The content server may be the content server in the embodiment corresponding to FIG. 1.

As shown in FIG. 9, the second bit rate prediction model and the network collection component may be deployed in the user terminal E. The network collection component may be configured to collect various status information of the user terminal E. The status information may include information such as a data size of a to-be-viewed video block, a playback frame rate of the user terminal E, a frame receiving time interval, and a bit rate of the video block. The status information may be configured as the network data, the network data is inputted into the second bit rate prediction model, and the second bit rate prediction model may output one predicted bit rate according to the network data, so as to transcode a next video block of the video block. The second bit rate prediction model has been trained and can accurately perform bit rate prediction. For a specific implementation of the training of the second bit rate prediction model, reference may be made to the descriptions of steps S101-S103 in the embodiment corresponding to FIG. 4, and details will not be described herein again.

As shown in FIG. 9, when the user E uses the user terminal E to watch a video B, the network collection component of the user terminal E collects information of the video block corresponding to a period of time 0-10 s (for example, information such as the data size of the video block, the download time of the video block, the duration of the video block, the buffer size and duration, the re-buffer and load time, the quantity of remaining unplayed video blocks, the frame receiving time interval, the difference between the actual download time and the playback time, the playback frame rate of the user terminal E, and the bit rate value of the video block). The information of the video block corresponding to the 0-10 s may be inputted into the second bit rate prediction model as the network data, and the second bit rate prediction model may predict a predicted target bit rate suitable for the next video block (the video block corresponding to 10-20 s).

Subsequently, the user terminal E may generate one video block content playback request based on the predicted target bit rate, and transmit the video block content playback request to the content server through an access point of a router. The content server may transcode the video block data corresponding to 10-20 s based on the predicted target bit rate to obtain a target video block (alternatively, the content server may select a target video block of a predicted target media bit rate from a plurality of pre-prepared video blocks), and return the target video block to the user terminal through the router. The user terminal may play the target video block after receiving the target video block. As shown in the figure, since more desirable network data of 0-10 s is obtained (for example, a current network speed is faster and the buffer is frequent) through analysis of the inputted network data during 0-10 s, a bit rate predicted by the second bit rate prediction model is larger (that is 1080 P). That is to say, if the bit rate value is increased, the user E may view the content of the video block (10-20 s) corresponding to the predicted target bit rate (1080 P).

It may be understood that the period of time 0-10 s and the period of time 10-20 s provided in the present disclosure are both examples for easy understanding and do not have actual reference significance.

In some embodiments, it may be understood that, the foregoing embodiments are all manners of obtaining the second bit rate prediction model by performing a test run by using the simulation player. The second bit rate prediction model is obtained by performing the test run by using the simulation player, and then the second bit rate prediction model is deployed to the user terminal or the service server for model application. It may be understood that the bit rate prediction neural network may be periodically trained and updated, and accordingly, the second bit rate prediction model may also be periodically updated based on the bit rate prediction neural network.

Figure 10:
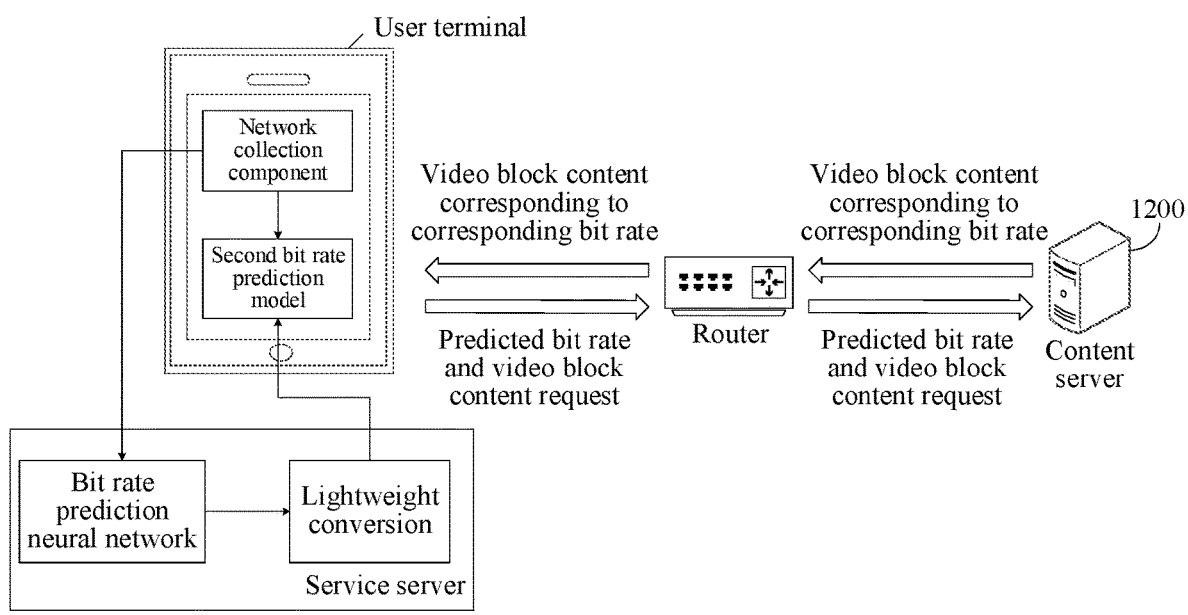
FIG. 10 is a schematic diagram of an architecture of model application according to an embodiment of the present disclosure.

For ease of understanding, referring to FIG. 10 together, FIG. 10 is a schematic diagram of an architecture of model application according to an embodiment of the present disclosure. As shown in FIG. 10, the bit rate prediction neural network is a trained neural network, the second bit rate prediction model may be obtained by performing lightweight conversion on the bit rate prediction neural network, and the second bit rate prediction model is deployed in the user terminal for model application. As shown in FIG. 10, the network collection component in the user terminal may collect network data within a period of time of time and transmit the network data to the second bit rate prediction model. The second bit rate prediction model may predict a bit rate suitable for the network data within the next period of time based on the network data. The user terminal may generate a video block content request based on the bit rate, and the video block content request of the user terminal may be transmitted to the content server 1200 through the router. The content server 1200 may transcode the corresponding video block based on the bit rate after receiving the video block content request, and return the transcoded video block to the user terminal through the router, so that the user terminal may play the transcoded video block.

It is to be understood that the bit rate prediction neural network may be periodically trained. After the bit rate prediction neural network is trained and updated, lightweight conversion may be performed on the trained and updated bit rate prediction neural network to obtain a new second bit rate prediction model that is more accurate for the bit rate prediction. The new second bit rate prediction model may be deployed in the user terminal, so that no video freezing occurs when the user uses the user terminal to view the video.

Figure 11:
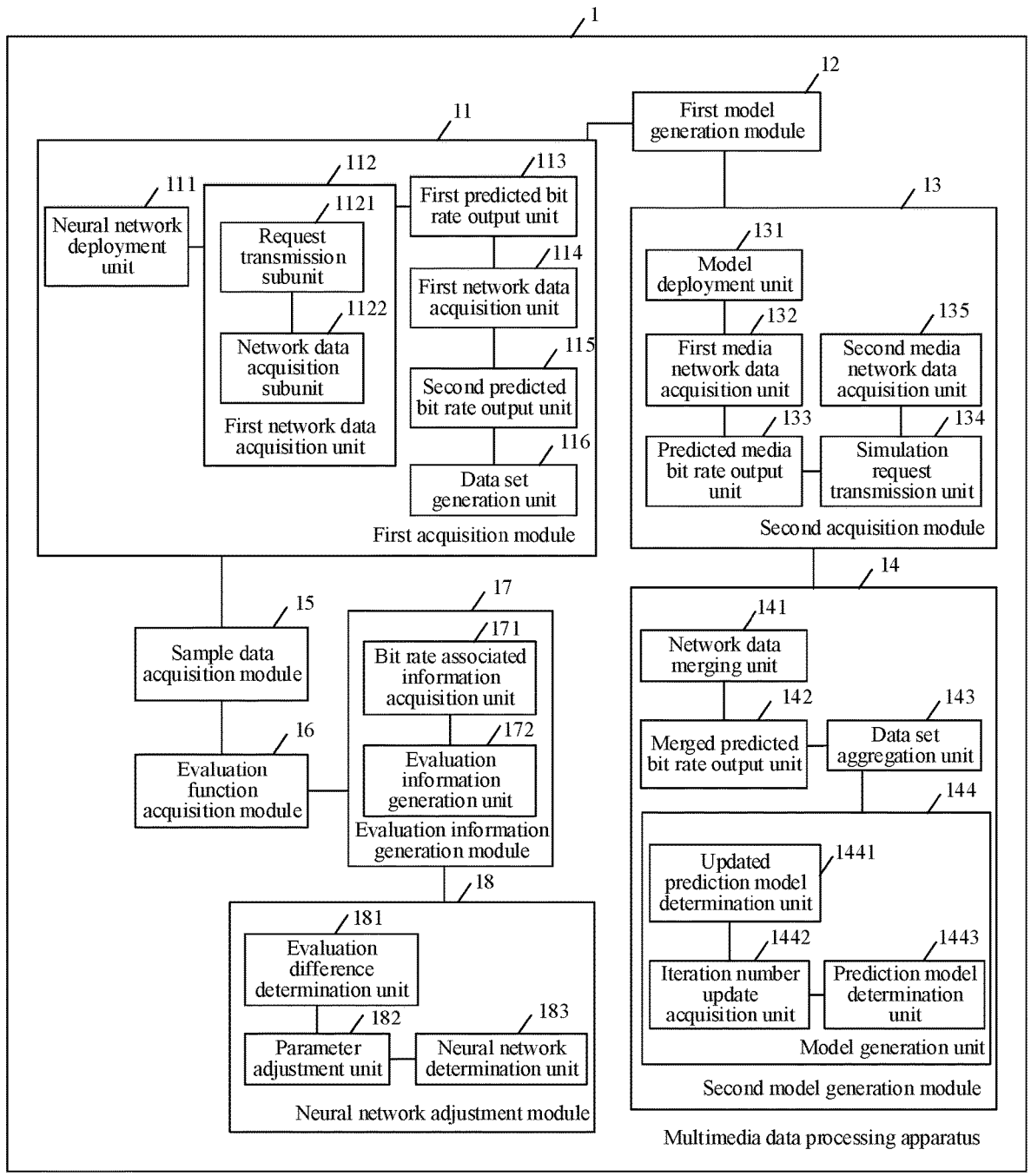
FIG. 11 is a schematic structural diagram of a multimedia data processing apparatus according to an embodiment of the present disclosure.

FIG. 11 is a schematic structural diagram of a multimedia data processing apparatus according to an embodiment of the present disclosure. The multimedia data processing apparatus may be a computer program (including program code) run in a computer device. For example, the multimedia data processing apparatus is application software. The data processing apparatus may be configured to perform the method shown in FIG. 4. As shown in FIG. 11, the multimedia data processing apparatus 1 may include a first acquisition module 11, a first model generation module 12, a second acquisition module 13, and a second model generation module 14.

The first acquisition module 11 is configured to acquire first network data and a first predicted bit rate corresponding to multimedia data. The first acquisition module may also be referred to as a data set acquisition module.

The first model generation module 12 is configured to perform classification and regression learning on the first network data and the first predicted bit rate to obtain a first bit rate prediction model. The first model generation module may also be referred to as a prediction model generation module.

The second acquisition module 13 is configured to acquire second network data and a second predicted bit rate corresponding to the multimedia data. The second acquisition module may also be referred to as a network data acquisition module.

The second model generation module 14 is configured to perform classification and regression learning on the first bit rate prediction model based on a difference between the first network data and the second network data and a difference between the first predicted bit rate and the second predicted bit rate, to obtain a second bit rate prediction model. The second bit rate prediction model is configured to perform bit rate prediction in a terminal that plays the multimedia data. The second model generation module may also be referred to as a prediction model determination module.

The first predicted bit rate is predicted by a bit rate prediction neural network based on the first network data, the second predicted bit rate is predicted by the first bit rate prediction model, and the second network data is network data collected during playback of the multimedia data based on the second predicted bit rate.

For specific implementations of the first acquisition module 11, the first model generation module 12, the second acquisition module 13, and the second model generation module 14, reference may be made to the descriptions of steps S101-S103 in the embodiment corresponding to FIG. 4, and details are not described herein again.

Referring to FIG. 11, the first acquisition module 11 may include: a neural network deployment unit 111, a first network data acquisition unit 112, a first predicted bit rate output unit 113, a first network data acquisition unit 114, a second predicted bit rate output unit 115, and a data set generation unit 116.

The neural network deployment unit 111 is configured to deploy the bit rate prediction neural network in a simulation player.

The first network data acquisition unit 112 is configured to acquire $i^{th}$ subnetwork data during simulative playback of the multimedia data by the simulation player deployed with the bit rate prediction neural network, i being an integer greater than or equal to 0. The first network data acquisition unit may also be referred to as a historical network data acquisition unit.

The first predicted bit rate output unit 113 is configured to output an $i^{th}$ predicted sub-bit rate matching the $i^{th}$ subnetwork data through the bit rate prediction neural network. The first predicted bit rate output unit may also be referred to as a historical predicted bit rate output unit.

The second network data acquisition unit 114 is configured to acquire $(i+1)^{th}$ subnetwork data during simulative playback of the multimedia data by the simulation player based on the $i^{th}$ predicted sub-bit rate. The second network data acquisition unit may also be referred to as a historical network data acquisition unit.

The second predicted bit rate output unit 115 is configured to input the $(i+1)^{th}$ subnetwork data into the bit rate prediction neural network to obtain an $(i+1)^{th}$ predicted sub-bit rate. The second predicted bit rate output unit may also be referred to as a historical predicted bit rate output unit.

The data set generation unit 116 is configured to generate a historical data set according to a data set formed by the $i^{th}$ subnetwork data and the $i^{th}$ predicted sub-bit rate and a data set formed by the $(i+1)^{th}$ subnetwork data and the $(i+1)^{th}$ predicted sub-bit rate.

The first network data includes at least the $i^{th}$ subnetwork data and the $(i+1)^{th}$ subnetwork data, and a first predicted bit rate includes at least the $i^{th}$ predicted sub-bit rate and the $(i+1)^{th}$ predicted sub-bit rate.

For specific implementations of the neural network deployment unit 111, the first network data acquisition unit 112, the first predicted bit rate output unit 113, the first network data acquisition unit 114, the second predicted bit rate output unit 115, and the data set generation unit 116, reference may be made to the description of step S101 in the embodiment corresponding to FIG. 4, and details are not described herein again.

Referring to FIG. 11, the first network data acquisition unit 112 may include a request transmission subunit 1121 and a network data collection subunit 1122.

The request transmission subunit 1121 is configured to transmit a simulative playback request for playing the multimedia data to a content server through the simulation player, the simulative playback request carrying the $i^{th}$ predicted sub-bit rate.

The network data collection subunit 1122 is configured to collect the $(i+1)^{th}$ subnetwork data by receiving the multimedia data transmitted by the content server based on the $i^{th}$ predicted sub-bit rate.

In some embodiments, the first acquisition module 11 is further configured to:

acquire the first network data during simulative playback of the multimedia data by a simulation player deployed with the bit rate prediction neural network; and input the first network data into the bit rate prediction neural network to obtain the first predicted bit rate.

For the specific implementations of the request transmission subunit 1121 and the network data collection subunit 1122, reference may be made to the description of acquiring the second historical network data in step S101 in the embodiment corresponding to FIG. 4, and details are not described herein again.

Referring to FIG. 11, the second acquisition module 13 may include a model deployment unit 131, a media network data acquisition unit 132, a predicted media bit rate output unit 133, a simulation request transmission unit 134, and a second media network data acquisition unit 135.

The model deployment unit 131 is configured to deploy an initial bit rate prediction model in the simulation player.

The first media network data acquisition unit 132 is configured to acquire $i^{th}$ media network data during simulative playback of the multimedia data by the simulation player deployed with the first bit rate prediction model, i being an integer greater than or equal to 0. The first media network data acquisition unit may also be referred to as an initial network data acquisition unit.

The predicted media bit rate output unit 133 is configured to input the $i^{th}$ media network data into the first bit rate prediction model to obtain an $i^{th}$ predicted media bit rate. The predicted media bit rate output unit may also be referred to as an initial predicted bit rate output unit.

The simulation request transmission unit 134 is configured to transmit, to a content server through the simulation player, a simulative playback request for playing the multimedia data, the simulative playback request carrying the $i^{th}$ predicted media bit rate.

The second media network data acquisition unit 135 is configured to collect $(i+1)^{th}$ media network data by receiving the multimedia data transmitted by the content server based on the $i^{th}$ predicted media bit rate.

The predicted media bit rate output unit 133 is further configured to input the $(i+1)^{th}$ media network data into the first bit rate prediction model to obtain the $(i+1)^{th}$ predicted media bit rate.

For specific implementations of the model deployment unit 131, the media network data acquisition unit 132, the predicted media bit rate output unit 133, the simulation request transmission unit 134, and the second media network data acquisition unit 135, reference may be made to the description of step S102 in the embodiment corresponding to FIG. 4, and details are not described herein again.

Referring to FIG. 11, the second model generation module 14 may include a network data merging unit 141, a merged predicted bit rate output unit 142, a data set aggregation unit 143, and a model generation unit 144.

The network data merging unit 141 is configured to merge the first network data with the second network data to obtain merged network data.

The merged predicted bit rate output unit 142 is configured to input the merged network data into the first bit rate prediction model to obtain a merged predicted bit rate.

The data set aggregation unit 143 is configured to aggregate the merged network data, the merged predicted bit rate, the first network data, and the first predicted bit rate to obtain an aggregated data set.

The model generation unit 144 is configured to perform classification and regression learning on the aggregated data set to obtain a second bit rate prediction model.

For specific implementations of the network data merging unit 141, the merged predicted bit rate output unit 142, the data set aggregation unit 143, and the model generation unit 144, reference may be made to the description of generating the aggregated data set in step S103 in the embodiment corresponding to FIG. 4, and details are not described herein again.

Referring to FIG. 11, the model generation unit 144 may include an updated prediction model determination unit 1441, an iteration number update acquisition unit 1442, and a prediction model determination unit 1443.

The updated prediction model determination unit 1441 is configured to perform classification and regression learning on the aggregated data set to obtain a first updated bit rate prediction model.

The iteration number update acquisition unit 1442 is configured to acquire a first model update iteration number corresponding to the first updated bit rate prediction model.

The prediction model determination unit 1443 is configured to determine the first updated bit rate prediction model as the second bit rate prediction model in response to the first model update iteration number satisfying an iteration number threshold.

The model generation unit 144 is further configured to:

acquire, in response to the first model update iteration number not satisfying the iteration number threshold, a third predicted bit rate predicted by the first updated bit rate prediction model; collect fourth network data during playback of the multimedia data based on the third predicted bit rate; reacquire the first network data and the first predicted bit rate corresponding to the bit rate prediction neural network; perform classification and regression learning on the first updated bit rate prediction model based on a difference between the reacquired first network data and the fourth network data and a difference between the reacquired first predicted bit rate and the third predicted bit rate, to obtain a second updated bit rate prediction model; acquire a second model update iteration number corresponding to the second updated bit rate prediction model; determine the second updated bit rate prediction model as the second bit rate prediction model in response to the second model update iteration number satisfying the iteration number threshold; and determining the second updated bit rate prediction model as the first updated bit rate prediction model and performing the step of predicting the third predicted bit rate by acquiring the first updated bit rate prediction model, in response to the model update iteration number not satisfying the iteration number threshold.

For specific implementations of the updated prediction model determination unit 1441, the iteration number update acquisition unit 1442, and the prediction model determination unit 1443, reference may be made to the description of step S103 in the embodiment corresponding to FIG. 4, and details are not described herein again.

Referring to FIG. 11, the multimedia data processing apparatus 1 may further include a sample data acquisition module 15, an evaluation function acquisition module 16, an evaluation information generation module 17, and a neural network adjustment module 18.

The sample data acquisition module 15 is configured to input the sample network data into a sample bit rate prediction neural network to obtain a predicted sample bit rate.

The evaluation function acquisition module 16 is configured to acquire an evaluation feedback function.

The evaluation information generation module 17 is configured to generate evaluation information according to the predicted sample media bit rate and the evaluation feedback function.

The neural network adjustment module 18 is configured to adjust the sample bit rate prediction neural network according to the evaluation information, to obtain the bit rate prediction neural network.

For specific implementations of the sample data acquisition module 15, the evaluation function acquisition module 16, the evaluation information generation module 17, and the neural network adjustment module 18, reference may be made to the descriptions of steps S201-S203 in the embodiment corresponding to FIG. 6, and details are not described herein again.

Referring to FIG. 11, the evaluation information generation module 17 may include a bit rate associated information acquisition unit 171 and an evaluation information generation unit 172.

The bit rate associated information acquisition unit 171 is configured to acquire freeze time information and bit rate fluctuation information corresponding to the predicted sample bit rate.

The evaluation information generation unit 172 is configured to generate evaluation information for the predicted sample bit rate according to the freeze time information, the bit rate fluctuation information, the predicted sample bit rate, and the evaluation feedback function.

For specific implementations of the bit rate associated information acquisition unit 171 and the evaluation information generation unit 172, reference may be made to the description of generating the evaluation feedback information in step S202 in the embodiment corresponding to FIG. 6, and details are not described herein again.

Referring to FIG. 11, the evaluation information includes an evaluation value, and the neural network adjustment module 18 may include an evaluation difference determination unit 181, a parameter adjustment unit 182, and a neural network determination unit 183.

The evaluation difference determination unit 181 is configured to acquire an evaluation feedback threshold, and determine an evaluation difference between the evaluation value and the evaluation feedback threshold.

The parameter adjustment unit 182 is configured to determine that a degree of matching between the predicted sample media bit rate and the sample network data does not satisfy a matching condition, and adjust the network parameter in the sample bit rate prediction neural network according to the evaluation difference to obtain the bit rate prediction neural network, in response to the evaluation difference exceeding a difference range.

The neural network determination unit 183 is configured to determine that the degree of matching between the predicted sample bit rate and the sample network data satisfies the matching condition, and determine the sample bit rate prediction neural network as the bit rate prediction neural network, in response to the evaluation difference falling within the difference range.

For specific implementations of the evaluation difference determination unit 181, the parameter adjustment unit 182, and the neural network determination unit 183, reference may be made to the description of step S203 in the embodiment corresponding to FIG. 6, and details are not described herein again.

In the embodiments of the present disclosure, the second bit rate prediction model used for performing the media bit rate prediction is constructed by performing the classification and regression learning on the aggregated data set, and the aggregated data set is aggregated according to the historical data set. Since the historical data set is determined by the bit rate prediction neural network with higher bit rate prediction accuracy, the second bit rate prediction model constructed according to the historical data set may also have higher bit rate prediction accuracy. In addition, compared with the neural network, the second bit rate prediction model constructed by the classification and regression learning has a characteristic of a lightweight structure. The second bit rate prediction model, when deployed in the target terminal, may cause the running overhead of the target terminal to be lower.

In addition, for network data within any period of time, the second bit rate prediction model may accurately predict the bit rate matching the network data. The terminal may play a target video block in a next period of time based on the predicted bit rate, thereby achieving adaptive bitrate network data. It is to be understood that this method of training the bit rate prediction neural network and performing lightweight conversion of the bit rate prediction neural network to obtain the second bit rate prediction model may cause the second bit rate model to be deployed on the terminal. Since the second bit rate prediction model is obtained based on the bit rate prediction neural network, the second bit rate prediction model also has higher bit rate prediction accuracy. In this way, the media bit rate may be adjusted in time when the network changes to make a response to a network change in real time, thereby reducing freeze of multimedia data (for example, video data), improving smoothness of playback of the multimedia data, and reducing a waste of a network bandwidth. In addition, since the second bit rate prediction model has the characteristic of the lightweight structure and can be deployed in the terminal, compared with the solution of deploying the bit rate prediction neural network in the terminal, the solution of the present disclosure can reduce the running overhead of the user terminal.

Figure 12:
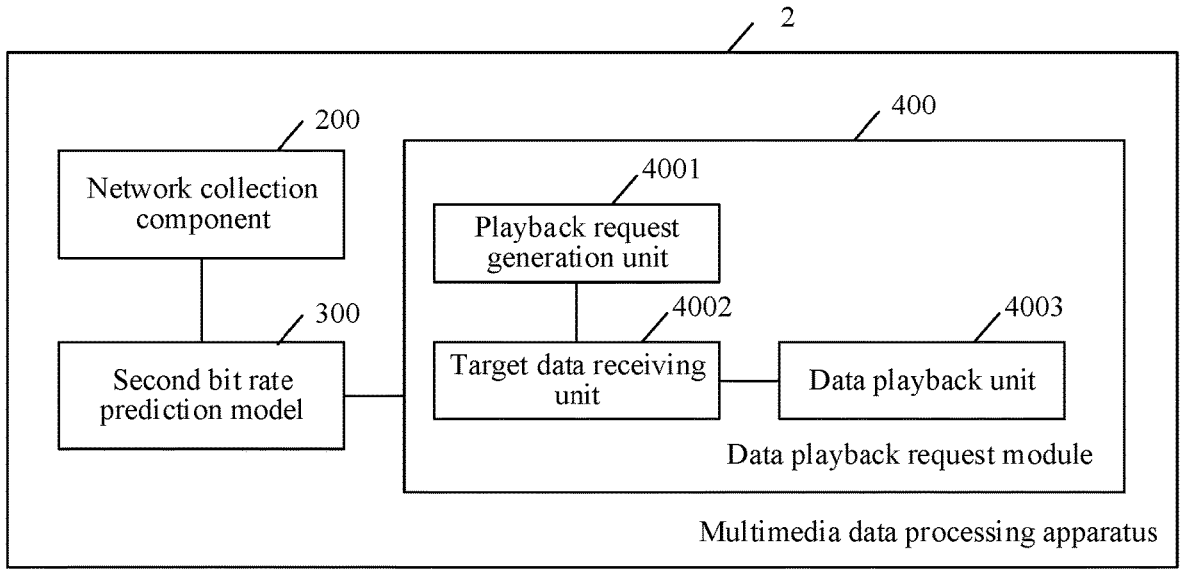
FIG. 12 is a schematic structural diagram of a multimedia data processing apparatus according to an embodiment of the present disclosure.

FIG. 12 is a schematic structural diagram of a multimedia data processing apparatus according to an embodiment of the present disclosure. The multimedia data processing apparatus may be configured to perform the method shown in FIG. 8. As shown in FIG. 12, the multimedia data processing apparatus 2 may include a network collection component 200, a second bit rate prediction model 300, and a data playback request module 400.

The network collection component 200 is configured to collect network data.

The second bit rate prediction model 300 is configured to output a predicted target media bit rate matching the network data.

The data playback request module 400 is configured to request, based on the predicted target media bit rate, a content server to play multimedia data.

The second bit rate prediction model 300 is a model generated by using the multimedia data processing method provided in the embodiment corresponding to FIG. 4.

For specific implementations of the network collection component 200, the second bit rate prediction model 300, and the data playback request module 400, reference may be made to the descriptions of steps S401-S403 in the embodiment corresponding to FIG. 8, and details are not described herein again.

Referring to FIG. 12, the data playback request module 400 may include a playback request generation unit 4001, a target data receiving unit 4002, and a data playback unit 4003.

The playback request generation unit 4001 is configured to generate a multimedia data content playback request according to the predicted target media bit rate, and transmit the multimedia data content playback request to the content server.

The target data receiving unit 4002 is configured to receive target multimedia data returned by the content server. The target multimedia data is data obtained based on the predicted target media bit rate.

The data playback unit 4003 is configured to play the target multimedia data.

For specific implementations of the playback request generation unit 4001, the target data receiving unit 4002, and the data playback unit 4003, reference may be made to the description of step S403 in the embodiment corresponding to FIG. 8, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 13:
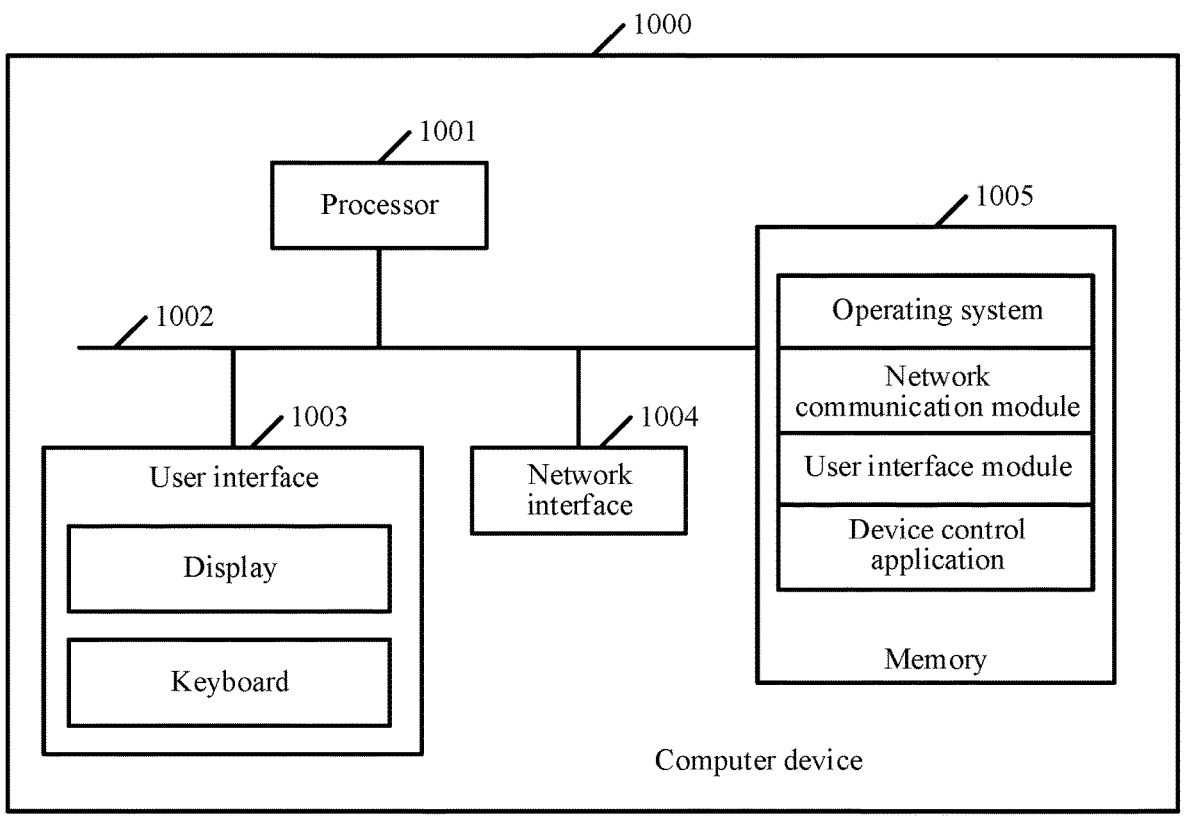
FIG. 13 is a schematic structural diagram of a computer device according to an embodiment of the present disclosure.

Further, FIG. 13 is a schematic structural diagram of a computer device according to an embodiment of the present disclosure. As shown in FIG. 13, the multimedia data processing apparatus 1 in the embodiment corresponding to FIG. 11 or the multimedia data processing apparatus in the embodiment corresponding to FIG. 12 may be applicable to the foregoing computer device 1000. The foregoing computer device 1000 may include a processor 1001, a network interface 1004, and a memory 1005. In addition, the foregoing computer device 1000 further includes a user interface 1003 and at least one communication bus 1002. The communication bus 1002 is configured to implement connection communication between these components. The user interface 1003 may include a display and a keyboard. In some embodiments, the user interface 1003 may further include a standard wired interface and a standard wireless interface. In some embodiments, the network interface 1004 may include a standard wired interface and a standard wireless interface (such as a Wi-Fi interface). The memory 1005 may be a high-speed RAM memory or a non-volatile memory, such as at least one magnetic disk memory. In some embodiments, the memory 1005 may further be at least one storage apparatus away from the foregoing processor 1001. As shown in FIG. 13, the memory 1005 used as a computer-readable storage medium may include an operating system, a network communication module, a user interface module, and a device-control application program.

In the computer device 1000 shown in FIG. 13, the network interface 1004 may provide a network communication function. The user interface 1003 is mainly configured to provide an input interface for a user. The processor 1001 may be configured to call a device control application stored in the memory 1005 to:

acquire first network data and a first predicted bit rate corresponding to a trained bit rate prediction neural network;

perform classification and regression learning on the first network data and the first predicted bit rate to obtain a first bit rate prediction model;

acquire second network data and a second predicted bit rate corresponding to the first bit rate prediction model; and perform classification and regression learning on the first bit rate prediction model based on a difference between the first network data and the second network data and a difference between the first predicted bit rate and the second predicted bit rate, to obtain a second bit rate prediction model, the second bit rate prediction model being configured to perform bit rate prediction in a terminal that plays multimedia data;

the first predicted bit rate being predicted by the bit rate prediction neural network based on the first network data, the second predicted bit rate being predicted by the first bit rate prediction model, and the second network data being network data collected during playback of the multimedia data based on the second predicted bit rate;

or collect network data.

input the network data into the second bit rate prediction model, and output a predicted target bit rate matching the network data through the second bit rate prediction model; and request, based on the predicted target bit rate, a content server to play multimedia data.

The second bit rate prediction model is obtained by using the multimedia data processing method provided in the embodiment corresponding to FIG. 4.

It is to be understood that the computer device 1000 described in this embodiment of the present disclosure may perform the multimedia data processing method in the foregoing embodiment corresponding to FIG. 4 or FIG. 8, or may perform the description of the multimedia data processing apparatus 1 in the embodiment corresponding to FIG. 11 or the multimedia data processing apparatus 2 in the foregoing embodiment corresponding to FIG. 12, and details are not described herein again. In addition, for the description of the beneficial effects of using the same method, details are not described again.

Furthermore, an embodiment of the present disclosure further provides a computer-readable storage medium, the computer-readable storage medium storing the computer program executed by the computer device 1000 for data processing, and the computer program including a program instruction. The program instruction, when executed by the processor, can cause the processor to perform the multimedia data processing method in the embodiment corresponding to FIG. 4 or FIG. 8. Therefore, details are not described herein again. In addition, for the description of the beneficial effects of using the same method, details are not described again. For technical details that are not disclosed in the embodiments of the computer-readable storage medium of the present disclosure, refer to the method embodiments of the present disclosure.

The computer-readable storage medium may be the multimedia data processing apparatus provided in any one of the foregoing embodiments or an internal storage unit of the foregoing computer device, for example, a hard disk or an internal memory of the computer device. The computer-readable storage medium may also be an external storage device of the computer device, for example, a plug-in hard disk, a smart media card (SMC), a secure digital (SD) card, a flash card, and the like equipped on the computer device. Further, the computer-readable storage medium may further include both the internal storage unit and the external storage device of the computer device. The computer-readable storage medium is configured to store a computer program and other programs and data required by the computer device. The computer-readable storage medium may further be configured to temporarily store data that has been outputted or that is to be outputted.

An aspect of the present disclosure provides a computer program product or a computer program, the computer program product or the computer program including a computer instruction, the computer instruction being stored in a computer-readable storage medium. The processor of the computer device reads the computer instruction from the computer-readable storage medium. The computer instruction, when executed by the processor, causes the computer device to perform the method provided in the embodiment corresponding to FIG. 4 or the embodiment corresponding to FIG. 8 in the embodiments of the present disclosure.

The terms "first", "second" and the like in the specification and claims of the embodiments of the present disclosure and the accompanying drawings are used for distinguishing different objects, rather than being used for describing a specific order. Moreover, the term "including" and any variation thereof are intended to cover non-exclusive inclusions. For example, processes, methods, apparatuses, products, or devices including a series of steps or units are not limited to the listed steps or modules, but instead, in some embodiments include steps or modules not listed, or in some embodiments include other steps or units inherent in these processes, methods, apparatuses, products, or devices.

A person of ordinary skill in the art may realize that steps of units and algorithms of various examples described with reference to the embodiments disclosed in this specification can be implemented in electronic hardware, computer software or a combination of the electronic hardware and the computer software. In order to clearly describe the interchangeability of hardware and software, the compositions and steps of the various examples have been generally described in terms of functionality in the foregoing description. Whether the functions are performed by hardware or software depends on particular applications and design constraint conditions of the technical solutions. A person skilled in the art may use different methods to implement the described functions for each particular application, but it is not to be considered that the implementation goes beyond the scope of the present disclosure.

The method and the related apparatus provided in the embodiments of the present disclosure are described with reference to the method flowcharts and/or schematic structural diagrams provided in the embodiments of the present disclosure. Specifically, each process and/or block in the method flowchart and/or the schematic structural diagram and a combination of the process and/or the block in the flowchart and/or the block diagram may be implemented by a computer program instruction. These computer program instructions may be provided to a processor of a general-purpose computer, a special-purpose computer, an embedded processing machine, or other programmable data processing devices to generate a machine, so that execution of the instructions by the processor of the computer or other programmable data processing devices generates an apparatus for implementing functions specified in one or more processes of the flowchart and/or one or more blocks of the schematic structural diagram. These computer program instructions may also be stored in a computer-readable memory that can direct a computer or other programmable data processing devices to operate in a specific manner, so that the instructions stored in the computer-readable memory produce a product including an instruction apparatus. The instruction apparatus implements the functions specified in one or more processes of the flowchart and/or one or more blocks of the schematic structural diagram. These computer program instructions may also be loaded onto a computer or other programmable data processing devices, so that a series of operating steps are performed on the computer or other programmable devices to generate a computer-implemented process, and the instructions executed on the computer or other programmable devices provide steps for implementing the functions specified in one or more processes of the flowchart and/or one or more blocks of the schematic structural diagram. The term "and/or" in the present disclosure is merely an association relationship describing related objects, which means that there may be three relationships, for example, A and/or B may indicate three cases: A exists alone, A and B exist simultaneously, and B exists alone. In addition, the character "/" in this specification generally indicates an "or" relationship between the associated objects.

The disclosed above are merely example embodiments of the present disclosure, which is not intended to limit the scope of the claims of the present disclosure. Therefore, an equivalent change made according to the claims of the present disclosure still falls within the scope covered by the present disclosure.

What is claimed is:

1. A multimedia data processing method, comprising:
acquiring first network data and a first predicted bit rate corresponding to multimedia data, the first predicted bit rate being predicted by a bit rate prediction neural network based on the first network data, the first network data being collected during a test run of the bit rate prediction neural network and simulative playback of the multimedia data and comprising a first data size of a first video block corresponding to a period of the simulative playback, and a first download time of the first video block;
performing classification and regression learning on the first network data and the first predicted bit rate to obtain a first bit rate prediction model;
acquiring second network data and a second predicted bit rate, the second predicted bit rate being predicted by the first bit rate prediction model, and the second network data being network data collected during playback of the multimedia data using the second predicted bit rate, the second network data collected during playback of the multimedia data comprising a second data size of a second video block corresponding to a period of the playback and a second download time of the second video block; and
performing classification and regression learning on the first bit rate prediction model based on a difference between the first network data and the second network data and a difference between the first predicted bit rate and the second predicted bit rate, to obtain a second bit rate prediction model, the second bit rate prediction model being configured to perform bit rate prediction in a terminal that plays the multimedia data, the difference between the first network data and the second network data comprising a difference between the first data size and the second data size and a difference between the first download time and the second download time.

2. The method according to claim 1, wherein the acquiring first network data and a first predicted bit rate corresponding to multimedia data comprises:
acquiring $i^{th}$ subnetwork data during the simulative playback of the multimedia data by a simulation player deployed with the bit rate prediction neural network, i being an integer greater than or equal to 0;
inputting the $i^{th}$ subnetwork data into the bit rate prediction neural network to obtain an $i^{th}$ predicted sub-bit rate;
acquiring $(i+1)^{th}$ subnetwork data during simulative playback of the multimedia data by the simulation player based on the $i^{th}$ predicted sub-bit rate; and
inputting the $(i+1)^{th}$ subnetwork data into the bit rate prediction neural network to obtain an $(i+1)^{th}$ predicted sub-bit rate;
the first network data comprising at least the $i^{th}$ subnetwork data and the $(i+1)^{th}$ subnetwork data, and the first predicted bit rate comprising at least the $i^{th}$ predicted sub-bit rate and the $(i+1)^{th}$ predicted sub-bit rate.

3. The method according to claim 2, wherein the acquiring $(i+1)^{th}$ subnetwork data during simulative playback of the multimedia data by the simulation player based on the $i^{th}$ predicted sub-bit rate comprises:
transmitting, to a content server by using the simulation player, a simulative playback request for playing the multimedia data, the simulative playback request carrying the $i^{th}$ predicted sub-bit rate; and
collecting the $(i+1)^{th}$ subnetwork data by receiving the multimedia data transmitted by the content server based on the $i^{th}$ predicted sub-bit rate.

4. The method according to claim 2, wherein the multimedia data is video data, and the simulation player is a simulation video player.

5. The method according to claim 1, wherein the acquiring first network data and a first predicted bit rate corresponding to multimedia data comprises:
acquiring the first network data during simulative playback of the multimedia data by a simulation player deployed with the bit rate prediction neural network; and
inputting the first network data into the bit rate prediction neural network to obtain the first predicted bit rate.

6. The method according to claim 1, wherein the acquiring second network data and a second predicted bit rate comprises:
acquiring $i^{th}$ media network data during simulative playback of the multimedia data by a simulation player deployed with the first bit rate prediction model, i being an integer greater than or equal to 0;
inputting the $i^{th}$ media network data into the first bit rate prediction model to obtain an $i^{th}$ predicted media bit rate;
transmitting, to a content server by using the simulation player, a simulative playback request for playing the multimedia data, the simulative playback request carrying the $i^{th}$ predicted media bit rate;
collecting $(i+1)^{th}$ media network data by receiving the multimedia data transmitted by the content server based on the $i^{th}$ predicted media bit rate; and
inputting the $(i+1)^{th}$ media network data into the first bit rate prediction model to obtain an $(i+1)^{th}$ predicted media bit rate;
the second network data comprising at least the $i^{th}$ media network data and the $(i+1)^{th}$ media network data, and the second predicted bit rate comprising at least the $i^{th}$ predicted media bit rate and the $(i+1)^{th}$ predicted media bit rate.

7. The method according to claim 1, wherein the performing classification and regression learning on the first bit rate prediction model based on a difference between the first network data and the second network data and a difference between the first predicted bit rate and the second predicted bit rate, to obtain a second bit rate prediction model comprises:
merging the first network data with the second network data to obtain merged network data;
inputting the merged network data into the first bit rate prediction model to obtain a merged predicted bit rate;
aggregating the merged network data, the merged predicted bit rate, the first network data, and the first predicted bit rate to obtain an aggregated data set; and
performing classification and regression learning on the aggregated data set to obtain the second bit rate prediction model.

8. The method according to claim 7, wherein the performing classification and regression learning on the aggregated data set to obtain the second bit rate prediction model comprises:

performing the classification and regression learning on the aggregated data set to obtain a first updated bit rate prediction model;
acquiring a first model update iteration number corresponding to the first updated bit rate prediction model; and
determining the first updated bit rate prediction model as the second bit rate prediction model in response to the first model update iteration number satisfying an iteration number threshold.

9. The method according to claim 8, further comprising:
acquiring, in response to the first model update iteration number not satisfying the iteration number threshold, a third predicted bit rate predicted by the first updated bit rate prediction model;
collecting fourth network data during playback of the multimedia data using the third predicted bit rate;
reacquiring the first network data and the first predicted bit rate corresponding to the bit rate prediction neural network;
performing classification and regression learning on the first updated bit rate prediction model based on a difference between the reacquired first network data and the fourth network data and a difference between the reacquired first predicted bit rate and the third predicted bit rate, to obtain a second updated bit rate prediction model;
acquiring a second model update iteration number corresponding to the second updated bit rate prediction model;
determining the second updated bit rate prediction model as the second bit rate prediction model in response to the second model update iteration number satisfying the iteration number threshold; and
determining the second updated bit rate prediction model as the first updated bit rate prediction model and performing the operation of acquiring the third predicted bit rate predicted by the first updated bit rate prediction model, in response to the model update iteration number not satisfying the iteration number threshold.

10. The method according to claim 1, further comprising:
acquiring sample network data, and inputting the sample network data into a sample bit rate prediction neural network, to obtain a predicted sample bit rate;
generating evaluation information according to the predicted sample bit rate and an evaluation feedback function; and
adjusting the sample bit rate prediction neural network according to the evaluation information, to obtain the bit rate prediction neural network.

11. The method according to claim 10, wherein the generating evaluation information according to the predicted sample bit rate and an evaluation feedback function comprises:
acquiring freeze time information and bit rate fluctuation information corresponding to the predicted sample bit rate; and
generating evaluation information for the predicted sample bit rate according to the freeze time information, the bit rate fluctuation information, the predicted sample bit rate, and the evaluation feedback function.

12. The method according to claim 10, wherein the evaluation information comprises an evaluation value, and the adjusting the sample bit rate prediction neural network according to the evaluation information, to obtain the bit rate prediction neural network comprises:
determining that a degree of matching between the predicted sample bit rate and the sample network data does not satisfy a matching condition, and adjusting a network parameter in the sample bit rate prediction neural network according to the difference to obtain the bit rate prediction neural network, in response to a difference between the evaluation value and an evaluation threshold exceeding a difference range; and
determining that the degree of matching between the predicted sample bit rate and the sample network data satisfies the matching condition, and determining the sample bit rate prediction neural network as the bit rate prediction neural network, in response to the difference between the evaluation value and the evaluation threshold falling within the difference range.

13. The method according to claim 1, further comprising:
collecting, by the terminal that hosts the second bit rate prediction model, target network data;
inputting, by the terminal, the target network data into the second bit rate prediction model to obtain a predicted target bit rate; and
requesting, by the terminal, a content server to play the multimedia data with the predicted target bit rate.

14. The method according to claim 13, wherein the requesting, by the terminal, a content server to play multimedia data comprises:
generating a playback request according to the predicted target bit rate;
transmitting the playback request to the content server;
receiving target multimedia data returned by the content server, the target multimedia data being data having the predicted target bit rate; and
playing the target multimedia data.

15. A multimedia data processing apparatus, comprising:
at least one processor and at least one memory, the at least one memory being configured to store program code, and the at least one processor being configured to invoke the program code to perform:
acquiring first network data and a first predicted bit rate corresponding to multimedia data, the first predicted bit rate being predicted by a bit rate prediction neural network based on the first network data, the first network data being collected during a test run of the bit rate prediction neural network and simulative playback of the multimedia data and comprising a first data size of a first video block corresponding to a period of the simulative playback, and a first download time of the first video block;
performing classification and regression learning on the first network data and the first predicted bit rate to obtain a first bit rate prediction model;
acquiring second network data and a second predicted bit rate, the second predicted bit rate being predicted by the first bit rate prediction model, and the second network data being network data collected during playback of the multimedia data using the second predicted bit rate, the second network data collected during playback of the multimedia data comprising a second data size of a second video block corresponding to a period of the playback and a second download time of the second video block; and
performing classification and regression learning on the first bit rate prediction model based on a difference between the first network data and the second network data and a difference between the first predicted bit rate and the second predicted bit rate, to obtain a second bit rate prediction model, the second bit rate prediction model being configured to perform bit rate prediction in a terminal that plays the multimedia data, the difference between the first network data and the second network data comprising a difference between the first data size and the second data size and a difference between the first download time and the second download time.

16. The apparatus according to claim 15, wherein the acquiring first network data and a first predicted bit rate comprises:
acquiring $i^{th}$ subnetwork data during the simulative playback of the multimedia data by a simulation player deployed with the bit rate prediction neural network, i being an integer greater than or equal to 0;
inputting the $i^{th}$ subnetwork data into the bit rate prediction neural network to obtain an $i^{th}$ predicted sub-bit rate;
acquiring $(i+1)^{th}$ subnetwork data during simulative playback of the multimedia data by the simulation player based on the $i^{th}$ predicted sub-bit rate; and
inputting the $(i+1)^{th}$ subnetwork data into the bit rate prediction neural network to obtain an $(i+1)^{th}$ predicted sub-bit rate;
the first network data comprising at least the $i^{th}$ subnetwork data and the $(i+1)^{th}$ subnetwork data, and the first predicted bit rate comprising at least the $i^{th}$ predicted sub-bit rate and the $(i+1)^{th}$ predicted sub-bit rate.

17. The apparatus according to claim 16, wherein the acquiring $(i+1)^{th}$ subnetwork data during simulative playback of the multimedia data by the simulation player based on the $i^{th}$ predicted sub-bit rate comprises:
transmitting, to a content server by using the simulation player, a simulative playback request for playing the multimedia data, the simulative playback request carrying the $i^{th}$ predicted sub-bit rate; and
collecting the $(i+1)^{th}$ subnetwork data by receiving the multimedia data transmitted by the content server based on the $i^{th}$ predicted sub-bit rate.

18. The apparatus according to claim 15, wherein the acquiring first network data and a first predicted bit rate corresponding to multimedia data comprises:
acquiring the first network data during simulative playback of the multimedia data by a simulation player deployed with the bit rate prediction neural network; and
inputting the first network data into the bit rate prediction neural network to obtain the first predicted bit rate.

19. The apparatus according to claim 15, wherein the acquiring second network data and a second predicted bit rate comprises:
acquiring $i^{th}$ media network data during simulative playback of the multimedia data by a simulation player deployed with the first bit rate prediction model, i being an integer greater than or equal to 0;
inputting the $i^{th}$ media network data into the first bit rate prediction model to obtain an $i^{th}$ predicted media bit rate;

transmitting, to a content server by using the simulation player, a simulative playback request for playing the multimedia data, the simulative playback request carrying the $i^{th}$ predicted media bit rate;
collecting $(i+1)^{th}$ media network data by receiving the multimedia data transmitted by the content server based on the $i^{th}$ predicted media bit rate; and
inputting the $(i+1)^{th}$ media network data into the first bit rate prediction model to obtain an $(i+1)^{th}$ predicted media bit rate;
the second network data comprising at least the $i^{th}$ media network data and the $(i+1)^{th}$ media network data, and the second predicted bit rate comprising at least the $i^{th}$ predicted media bit rate and the $(i+1)^{th}$ predicted media bit rate.

20. A non-transitory computer-readable storage medium, storing a computer program, the computer program comprising a program instruction, the program instruction, when executed by at least one processor, causing the at least one processor to perform:
acquiring first network data and a first predicted bit rate corresponding to multimedia data, the first predicted bit rate being predicted by a bit rate prediction neural network based on the first network data, the first network data being collected during a test run of the bit rate prediction neural network and simulative playback of the multimedia data and comprising a first data size of a first video block corresponding to a period of the simulative playback, and a first download time of the first video block;
performing classification and regression learning on the first network data and the first predicted bit rate to obtain a first bit rate prediction model;
acquiring second network data and a second predicted bit rate, the second predicted bit rate being predicted by the first bit rate prediction model, and the second network data being network data collected during playback of the multimedia data using the second predicted bit rate, the second network data collected during playback of the multimedia data comprising a second data size of a second video block corresponding to a period of the playback and a second download time of the second video block; and
performing classification and regression learning on the first bit rate prediction model based on a difference between the first network data and the second network data and a difference between the first predicted bit rate and the second predicted bit rate, to obtain a second bit rate prediction model, the second bit rate prediction model being configured to perform bit rate prediction in a terminal that plays the multimedia data, the difference between the first network data and the second network data comprising a difference between the first data size and the second data size and a difference between the first download time and the second download time.

* * * * *